(12) United States Patent
Oshinowo

(10) Patent No.: US 11,090,581 B1
(45) Date of Patent: Aug. 17, 2021

(54) OIL AND WATER SEPARATION

(71) Applicant: Saudi Arabian Oil Company, Dhahran (SA)

(72) Inventor: Olanrewaju Malcolm Oshinowo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/912,429

(22) Filed: Jun. 25, 2020

(51) Int. Cl.
*B01D 17/028* (2006.01)
*C02F 1/40* (2006.01)
*B01D 17/04* (2006.01)
*B01D 17/02* (2006.01)
*C02F 101/32* (2006.01)

(52) U.S. Cl.
CPC ........ *B01D 17/045* (2013.01); *B01D 17/0211* (2013.01); *B01D 17/0214* (2013.01); *C02F 1/40* (2013.01); *C02F 2101/32* (2013.01)

(58) Field of Classification Search
CPC ............ B01D 17/0211; B01D 17/0214; B01D 17/045; C02F 1/40
USPC ....... 210/776, 801, 802, 519, 521, 522, 540, 210/DIG. 5
See application file for complete search history.

(56) References Cited

U.S. PATENT DOCUMENTS

| | | | |
|---|---|---|---|
| 1,702,612 A * | 2/1929 | Morse | B01D 17/0208 210/519 |
| 3,844,743 A * | 10/1974 | Jones | B01D 17/045 210/DIG. 5 |
| 3,951,810 A | 4/1976 | Crisafulli | |
| 3,957,656 A | 5/1976 | Castelli | |
| 4,081,373 A | 3/1978 | Rozniecki | |
| 4,120,797 A | 10/1978 | Huebner | |

(Continued)

FOREIGN PATENT DOCUMENTS

| CN | 2566925 | 8/2003 |
|---|---|---|
| CN | 101857286 | 10/2010 |

(Continued)

OTHER PUBLICATIONS

Capps et al., "Reduce oil and grease content in wastewater," Hydrocarbon Processing, United States, Journal vol. 72:6; Journal ID: ISSN 0018-8190, 5 pages.

(Continued)

*Primary Examiner* — Christopher Upton
(74) *Attorney, Agent, or Firm* — Fish & Richardson P.C.

(57) ABSTRACT

A system includes a vessel, a module, and an oil skimming trough. The vessel includes a feed inlet distributor. The feed inlet distributor includes an inlet pipe, a housing, and multiple vanes disposed within the housing. The inlet pipe is configured to receive a feed stream including oil and water. The housing defines multiple perforations. The vanes are configured to direct flow of the feed stream to exit the housing through the perforations. The module is disposed within the vessel downstream of the feed inlet distributor. The module includes multiple coalescer plates and a set of baffles disposed within the vessel downstream of the coalescer plates. The set of baffles includes a first underflow baffle, an overflow baffle, and a second underflow baffle. The second underflow baffle defines multiple perforations. The oil skimming trough spans longitudinally across the vessel.

18 Claims, 21 Drawing Sheets

(56) References Cited

U.S. PATENT DOCUMENTS

| | | | |
|---|---|---|---|
| 4,123,365 A * | 10/1978 | Middelbeek | B01D 17/0211 210/521 |
| 4,278,545 A * | 7/1981 | Batutis | B01D 17/0214 210/521 |
| 4,479,875 A | 10/1984 | Nelson | |
| 4,581,134 A | 4/1986 | Richter, Jr. et al. | |
| 4,596,586 A | 6/1986 | Davies et al. | |
| 4,722,800 A | 2/1988 | Aymong | |
| 5,068,035 A | 11/1991 | Mohr | |
| 5,132,010 A * | 7/1992 | Ossenkop | B01D 17/0214 210/522 |
| 5,204,000 A * | 4/1993 | Steadman | B01D 17/0214 210/519 |
| 5,242,604 A | 9/1993 | Young et al. | |
| 5,443,724 A | 8/1995 | Williamson et al. | |
| 5,520,825 A * | 5/1996 | Rice | B01D 17/0211 210/802 |
| 6,533,684 B2 | 3/2003 | Winfield et al. | |
| 6,537,458 B1 * | 3/2003 | Polderman | B01D 17/0214 210/801 |
| 6,767,459 B1 | 7/2004 | Sinker et al. | |
| 6,843,832 B2 | 1/2005 | Greene et al. | |
| 7,044,308 B2 | 5/2006 | Benson | |
| 8,080,158 B2 | 12/2011 | Lee et al. | |
| 8,337,603 B2 | 12/2012 | Akhras et al. | |
| 8,985,343 B1 | 3/2015 | Mohr | |
| 9,157,035 B1 | 10/2015 | Ball, IV et al. | |
| 9,181,499 B2 | 11/2015 | Mason et al. | |
| 9,833,727 B1 | 12/2017 | Ball, IV | |
| 10,627,170 B2 | 4/2020 | Fioriti et al. | |
| 2003/0019821 A1 * | 1/2003 | Aymong | B01D 17/045 210/801 |
| 2004/0159606 A1 * | 8/2004 | Thacker | B01D 17/045 210/521 |
| 2006/0078724 A1 | 4/2006 | Bhushan et al. | |
| 2006/0242933 A1 | 11/2006 | Webb et al. | |
| 2007/0062887 A1 | 3/2007 | Schwandt et al. | |
| 2007/0131235 A1 | 6/2007 | Janikowski et al. | |
| 2007/0277967 A1 | 12/2007 | Oserod | |
| 2008/0011693 A1 | 1/2008 | Li et al. | |
| 2010/0326922 A1 | 12/2010 | Varanasi et al. | |
| 2013/0292327 A1 | 11/2013 | Andreussi et al. | |
| 2015/0004889 A1 | 1/2015 | Seth | |
| 2015/0114903 A1 | 4/2015 | Sivaramakrishnan et al. | |

FOREIGN PATENT DOCUMENTS

| | | |
|---|---|---|
| CN | 104876298 | 9/2015 |
| GB | 2374818 | 1/2005 |
| WO | WO 2010132785 | 11/2010 |
| WO | WO 2015143155 | 9/2015 |
| WO | WO 2018129228 | 7/2018 |
| WO | WO 2018236644 | 12/2018 |

OTHER PUBLICATIONS

Cummings et al., "A model of phyllotaxis," Journal of Theoretical Biology, 192, 531-544, 1998, 14 pages.

Davis, "Fibonacci numbers for palm foliar spirals," Acta Botanica Neerlandica, 19(2), 249-256, Apr. 1970, 8 pages.

Dixon, "The mathematics and computer graphics of spirals in plants," Leonardo, 16(2), 86-90, Spring 1983, 6 pages.

Erickson, "Tubular packing of spheres in biological fine structure," Science, 181(4101), 705-716, Aug. 1973, 12 pages.

Ferry, "The phyllotaxis of the date palm," Proc. Inter. Conf. on Date Palms, (pp. 559-571). Al-Ain, UAE, 1998, 13 pages.

Fowler et al., "Modelling spiral phyllotaxis," Computers & Graphics, 13(3), 291-296, 1989, 6 pages.

Han et al., "Review of the recent advances in design of corrugated plate packs applied for oil-water separation," Journal of Industrial and Engineering Chemistry, 53, 37-50, 2017, 57 pages.

Jaisinghani et al., A study of oil/water separation in corrugated plate separators. Journal of Engineering for Industry, 101(4), 441-448, 1979, 8 pages.

Kenawy et al., "Comparative Evaluation between a Modified CFP Separator and All Other Available Oil-Water Separation Techniques," Society of Petroleum Engineers, SPE International Conference on Health, Safety, and Environment in Oil and Gas Exploration and Production, Jun. 7-10, 1998, doi:10.2118/46817-MS, Jan. 1, 1998, 8 pages.

Kenawy et al., "Produced water treatment technology, a study of oil/water separation in gravity type cross flow pack separators for qualitative separation," SPE-36056-PA, SPE Production & Facilities, 12(02), 112-115, 1997, 4 pages.

Kundua et al., "Treatment and reclamation of hydrocarbon-bearing oily wastewater as a hazardous pollutant by different processes and technologies: a state-of-the-art review," Reviews in Chemical Engineering, 35(1), 73-108, 2019, 38 pages.

Rehm et al., "Enhanced Oil-Water Separation—The Performax Coalescer," Society of Petroleum Engineers, SPE Production Operations Symposium, Feb. 27-Mar. 1, Oklahoma City, Oklahoma, doi:10.2118/11562-MS, SPE-11562-MS, Jan. 1983, 7 pages.

Saudi Aramco, SAES-A-012, Process Design Criteria for Produced Water Treatment and Disposal. Dhahran: Saudi Aramco, Mar. 2, 2013, 36 pages.

Trofaier et al., "Optimizing Separation Efficiency of Produced Water Tanks by Installing CFD Designed Internals," SPE-174937-MS, Presented at the SPE Annual Technical Conference and Exhibition, Houston, TX, Sep. 28-30, 2015; Society of Petroleum Engineers, 2015, 11 pages.

ultraspin.co.za (online), "Oil Water Information—Completing the learning curve on oily water separator technology," retrieved from URL <http://www.ultraspin.co.za/learning-centre/oily-water-tutorials/>, available on or before May 22, 2019, retrieved on Jul. 13, 2020, 9 pages.

wikipedia.org "API Specification 421," retrieved from URL <https://en.wikipedia.org/wiki/API_oil%E2%80%93water_separator>, retrieved on Jun. 8, 2020, available on or before Mar. 2013, 3 pages.

* cited by examiner

OIL AND WATER SEPARATION

TECHNICAL FIELD

This disclosure relates to phase separation, and in particular, oil and water separation.

BACKGROUND

Considerable amounts of water can be produced as a by-product of oil and gas production processes. The produced water is treated so that it can, for example, be safely discharged into a body of water or re-injected into a reservoir. Produced water treatment can include various processes to separate undesirable substances from the produced water. Some examples include de-oiling, removing total dissolved solids, and softening.

SUMMARY

Certain aspects of the subject matter can be implemented as an oil-water separation system. The system includes a vessel, a module, and an oil skimming trough. The vessel includes a feed inlet distributor. The feed inlet distributor includes an inlet pipe, a housing, and multiple vanes disposed within the housing. The inlet pipe is configured to receive a feed stream. The feed stream includes oil and water. An outlet of the inlet pipe is coupled to the housing. A cross-sectional area of the housing is larger than a cross-sectional area of the inlet pipe with respect to the flow of the feed stream. The larger cross-sectional area of the housing is configured to slow down the flow of the feed stream, thereby facilitating separation of the oil and the water. The housing defines multiple perforations. The vanes are configured to direct flow of the feed stream to exit the housing through the perforations. The module is disposed within the vessel downstream of the feed inlet distributor. The module includes multiple coalescer plates. The coalescer plates are configured to facilitate coalescence of the oil. The module includes a set of baffles. The set of baffles includes a first underflow baffle, a second underflow baffle, and an overflow baffle disposed between the first and second underflow baffles. The first underflow baffle is configured to direct flow under the first underflow baffle. The overflow baffle is configured to be submerged below a liquid level within the vessel and direct fluid flow over the overflow baffle. The second underflow baffle is downstream of the first underflow baffle and defines multiple perforations. The second underflow baffle is configured to direct fluid flow under the second underflow baffle and through the perforations of the second underflow baffle. The oil skimming trough is disposed within the vessel. The oil skimming trough spans longitudinally across the vessel and is downwardly sloped with respect to gravity toward an inner surface of the vessel. The oil skimming trough is configured to skim oil from an oil-water interface layer formed within the vessel.

This, and other aspects, can include one or more of the following features.

In some implementations, the module includes a porous or perforated wall disposed within the vessel between the feed inlet distributor and the coalescer plates.

In some implementations, the system includes multiple modules. In some implementations, each of the modules are spaced longitudinally apart from one another within the vessel.

In some implementations, each of the coalescer plates are parallel to one another and upwardly sloped with respect to gravity.

In some implementations, one or more of the first underflow baffle, the second underflow baffle, or the overflow baffle includes a rounded tip.

In some implementations, a spacing between the first underflow baffle and the overflow baffle is substantially the same as a spacing between the overflow baffle and the second underflow baffle.

In some implementations, the system includes multiple guide vanes disposed between the first and second underflow baffles and above the overflow baffle with respect to gravity. In some implementations, the guide vanes are configured to be submerged below the liquid level within the vessel.

In some implementations, the guide vanes span from the overflow baffle to the second underflow baffle.

In some implementations, the guide vanes span from the first underflow baffle to the second underflow baffle.

In some implementations, the outlet of the inlet pipe is coupled to a lower portion of the housing of the feed inlet distributor. In some implementations, the perforations defined by the housing of the feed inlet distributor are on an upper portion of the housing of the feed inlet distributor.

In some implementations, the oil skimming trough spans longitudinally across the vessel over an area that covers the housing of the feed inlet distributor, the first module, and the second module.

In some implementations, the module includes a porous or perforated wall directly upstream of the coalescer plates. In some implementations, the module is a first module. In some implementations, the system includes a second module disposed within the vessel downstream of the first module. In some implementations, the second module is substantially the same as the first module. In some implementations, the oil skimming trough spans longitudinally across the vessel over an area that covers the housing of the feed inlet distributor, the first module, and the second module.

In some implementations, the housing of the feed inlet distributor is configured to be submerged below the liquid level within the vessel.

In some implementations, the coalescer plates are corrugated. In some implementations, for each of the coalescer plates, a contact angle between an oil droplet and a surface of the respective coalescer plate is greater than 90 degrees.

Certain aspects of the subject matter can be implemented as a method. A feed stream including oil and water is received by an inlet pipe. The feed stream is discharged from an outlet of the inlet pipe into a housing. The housing has a cross-sectional area that is larger than a cross-sectional area of the inlet pipe in relation to a direction of fluid flow. The housing is disposed within a vessel. The feed stream is directed by multiple vanes disposed within the housing to exit the housing through multiple perforations defined by the housing. A module is disposed within the vessel downstream of the housing. Oil droplets of the oil are coalesced by multiple coalescer plates of the module. The coalesced oil droplets are directed by the coalescer plates in an upwardly sloped direction that opposes gravity. The module includes a set of baffles disposed within the vessel downstream of the coalescer plates. The set of baffles includes a first underflow baffle, an overflow baffle, and a second underflow baffle. Fluid flow is directed under a first underflow baffle. Fluid flow is directed over an overflow baffle. The overflow baffle is downstream of the first underflow baffle. Fluid flow is directed under a second underflow baffle. The second underflow baffle is downstream of the overflow baffle. The coalesced oil droplets are directed by an oil skimming trough toward an inner surface of the vessel. The oil skimming trough is disposed within the vessel and spans longitudinally across the vessel. The oil skimming trough is downwardly sloped with respect to gravity toward the inner surface of the vessel. The water is discharged from the vessel.

This, and other aspects can include one or more of the following features.

In some implementations, the feed stream includes up to 10 volume % oil.

In some implementations, the water discharged from the vessel has an oil concentration that is less than 50 parts per million.

In some implementations, coalescing the droplets of oil includes receiving the droplets of oil by the coalescer plates, and the droplets of oil coalesce together while traveling across the coalescer plates.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes oil and water separation. In particular, this disclosure describes separating oil and water in an oily water stream in which the oil phase is dispersed in the bulk water phase. The oil and water separation includes velocity reduction of the fluid stream, flow conditioning, droplet coalescing, and oil disengagement and collection. The subject matter described in this disclosure can be implemented in particular implementations, so as to realize one or more of the following advantages. Processing capacity and throughput of produced water can be increased in comparison to conventional separators while maintaining consistent oil removal. The modularized assembly of hydrodynamic controlling elements for the function of velocity reduction, flow distribution, oil coalescence, oil disengagement/skimming, anti-surge control, and level control contribute to the increased capacity. The concepts described can be implemented as a retrofit option for existing separator vessels and increase their capacities by over 50% and reduce oil concentrations in the treated water to 50 parts per million (ppm). The concepts described can be implemented in new oil-water separator vessels. The oil-water separator includes multiple modules that improve oil-water separation. Large-scale recirculation in the oil-water separator can be mitigated. Streamlines (general fluid flow direction) are primarily parallel to the oil-water separator's longitudinal axis. Top-down rotation of fluid flow and draw-down flow patterns within the oil-water separator are reduced in comparison to conventional separators. The aforementioned advantages also result in an increase in oil skimming rate in the oil-water separator. Residence time distribution is narrower in the oil-water separator in comparison to conventional separators. Guide vanes located between baffles reduce transverse flow of fluid near the oil-water interface and also distributes fluid flow longitudinally across the vessel. Longitudinal oil skimming troughs can absorb flow surges that may be caused by rapid inlet feed fluctuations, thereby mitigating the negative impact on oil skimming and removal.

Figure 1A:
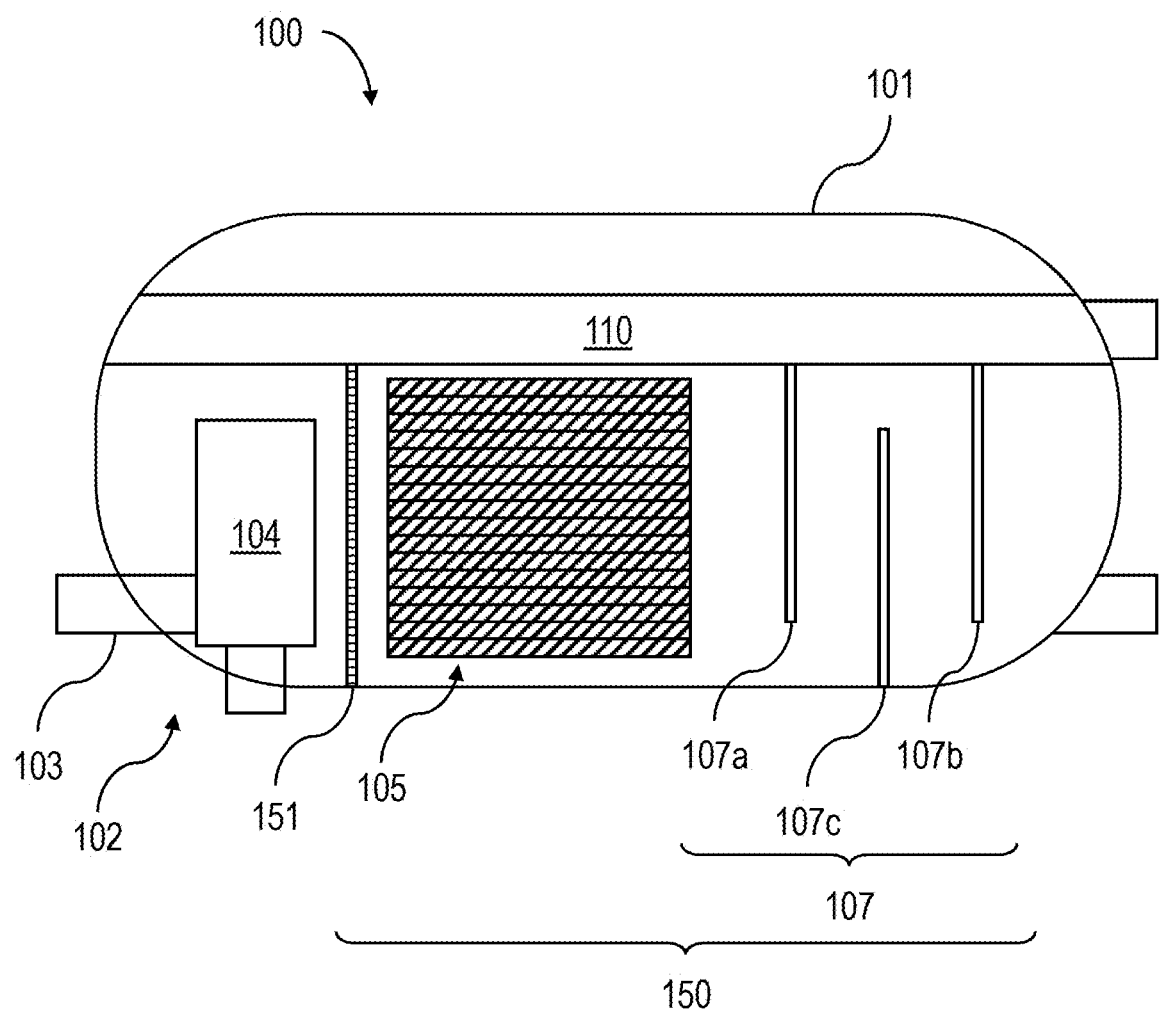
FIG. 1A is a schematic diagram of an example phase separator.

FIG. 1A is a schematic diagram of an oil-water separation system 100. The oil-water separation system 100 includes a vessel 101. The vessel 101 includes a feed inlet distributor 102. The feed inlet distributor 102 includes an inlet pipe 103 and a housing 104. The oil-water separation system 100 includes a module 150, and an oil skimming trough 110, each of which are disposed within the vessel 101. The module 150 is disposed within the vessel 101 downstream of the feed inlet distributor 102 and includes multiple coalescer plates and a set of baffles 107. The set of baffles 107 is disposed within the vessel 101 downstream of the coalescer plates 105 and includes a first underflow baffle 107a, a second underflow baffle 107b, and an overflow baffle 107c.

The coalescer plates 105 are configured to coalesce oil droplets together, and the set of baffles 107 is configured to disengage fluid flow to facilitate oil-water separation. Although shown in FIG. 1A as including one module 150, the oil-water separation system 100 can include additional modules 150, such as two modules 150, three modules 150, or more than three modules 150. The modularity of the oil-water separation system 100 promotes de-oiling in stages. In some implementations, the module 150 includes a porous or perforated wall 151 directly upstream of the coalescer plates 105. The porous or perforated wall 151 is described in more detail later.

Figure 1B:
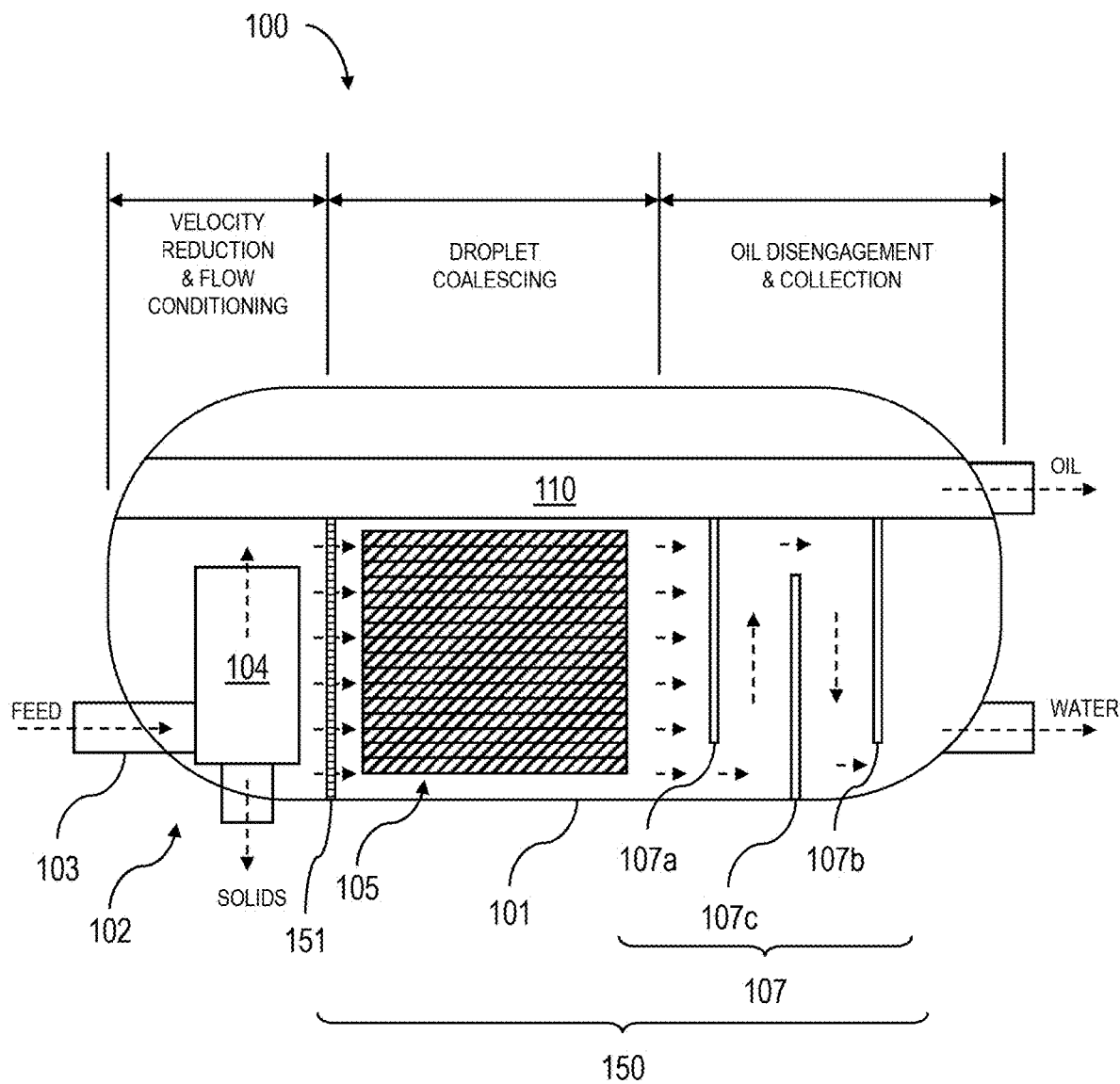
FIG. 1B is a schematic diagram of an example phase separator that includes a representation of fluid flow through the phase separator.

FIG. 1B is a schematic diagram of the oil-water separation system 100 that includes a representation of fluid flow through the oil-water separation system 100. The velocity reduction and flow conditioning portion of the oil-water separation system 100 includes the feed inlet distributor 102. The droplet coalescing portion of the oil-water separation system 100 includes the coalescer plates 105. The oil disengagement and collection portion of the oil-water separation system 100 includes the baffles 107 and the oil skimming trough 110.

A feed stream including oil and water flows to the oil-water separation system 100. In some implementations, the feed stream includes up to about 10 volume percent (vol. %) of oil. The inlet pipe 103 is configured to receive the feed stream. An outlet of the inlet pipe 103 is coupled to the housing 104. The feed stream flows through the inlet pipe 103 and into the housing 104. The feed inlet distributor 102 is configured to distribute the flow of the feed stream to facilitate separation of oil and water. In cases where the feed stream includes solid material, the solid material can fall out of the bottom of the housing 104 and stored (for example, in a solids receptacle) or disposed.

The feed stream exits the housing 104 and flows through a porous or perforated plate to the module 150. The coalescer plates 150 are configured to facilitate coalescence of the oil. For example, the oil may exist in the feed stream as oil droplets dispersed in the bulk water phase. The coalescer plates 105 promote the coalescence of these oil droplets. Because of gravity, lighter fluid (for example, oil) will tend to rise in relation to the denser fluid (for example, water). Therefore, the coalesced oil droplets will tend to rise within the vessel in relation to the water. In general, as fluid flows within the vessel 101, oil will tend to rise in relation to water, and the oil will accumulate in an upper fluid layer within the vessel 101. The coalescer plates 105 are described in more detail later.

Fluid then flows from the coalescer plates 105 to the set of baffles 107. The first underflow baffle 107a is configured to direct fluid flow under the first underflow baffle 107a. The overflow baffle 107c is disposed between the first underflow baffle 107a and the second underflow baffle 107b. The overflow baffle 107c is configured to direct fluid flow over the overflow baffle 107c. The second underflow baffle 107b is configured to direct fluid flow under the second underflow baffle 107a.

The tortuous flow path of the set of baffles 107 also facilitates separation of oil and water. Oil will tend to remain upstream of the first underflow baffle 107a because oil is less likely to flow under the first underflow baffle 107a in comparison to water. If, however, oil manages to flow with water under the first underflow baffle 107a, the oil will tend to remain as an upper layer in the stagnation region downstream of the first underflow baffle 107a and upstream of the second underflow baffle 107b. The set of baffles 107 is described in more detail later.

The oil skimming trough 110 is configured to skim oil from an oil-water interface layer formed within the vessel 101. As oil accumulates in the upper fluid layer within the vessel 101, the oil skimming trough 110 skims oil from the upper fluid layer and discharges the oil from the vessel 101. The oil skimming trough 110 is described in more detail later.

In some implementations, the module 150 includes a porous or perforated wall 151 directly upstream of the coalescer plates 105. The porous or perforated wall 151 includes pores, perforations, slots, mesh, or a combination of these. The porous or perforated wall 151 can facilitates separation of oil and water. For example, the porous or perforated wall 151 can slow down the velocity of the fluid flowing within the vessel 101, which facilitates separation of oil and water. In some implementations, the oil-water separation system 100 includes additional porous or perforated walls 151 that can be disposed between two components of the oil-water separation system 100. For example, an additional porous or perforated wall 151 can be disposed between the coalescer plates 105 and the set of baffles 107. In some implementations, the module 150 includes two porous or perforated walls 151 disposed directly upstream of the coalescer plates 105. In such implementations, the open flow areas of the two porous perforated walls 151 can be different from one another. For example, the first porous or perforated wall 151 can have a larger open flow area, larger perforations, or both in comparison to the second porous or perforated wall 151.

Figure 2A:
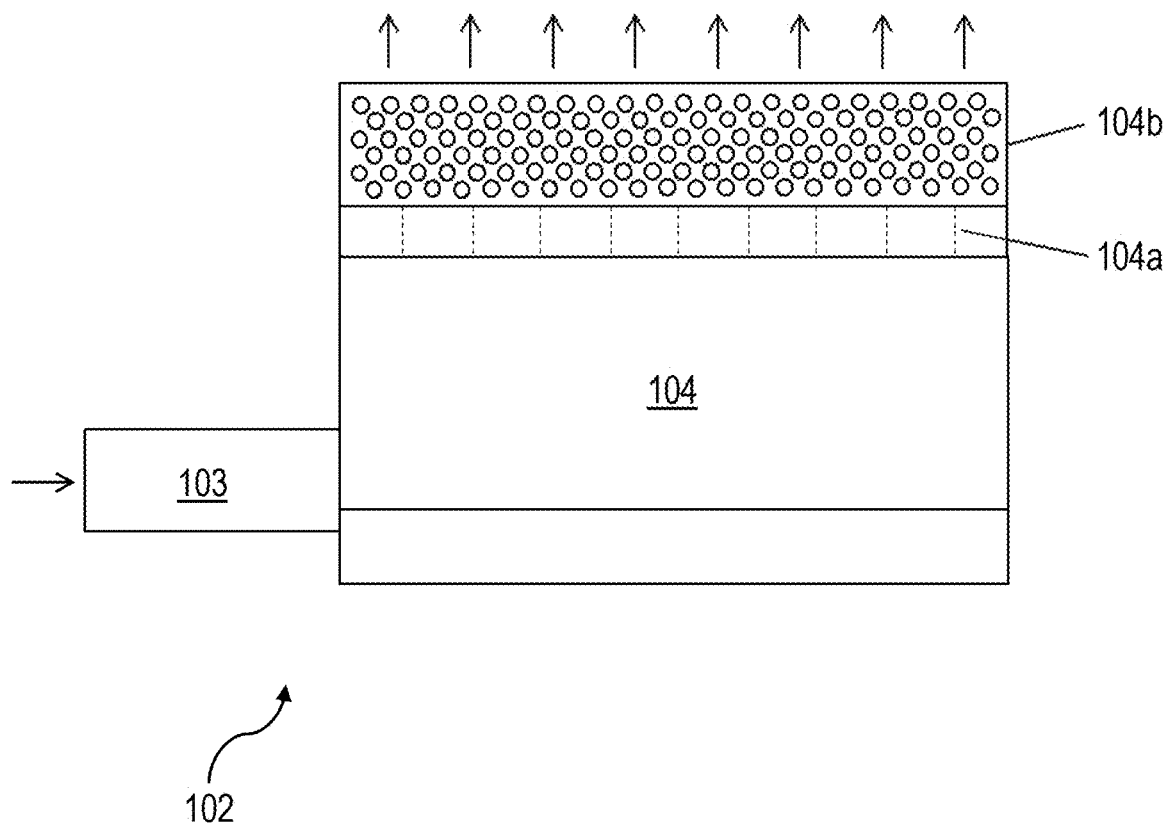
FIG. 2A is a side view of an example feed inlet distributor that can be implemented in the phase separator of FIG. 1A.
Figure 2B:
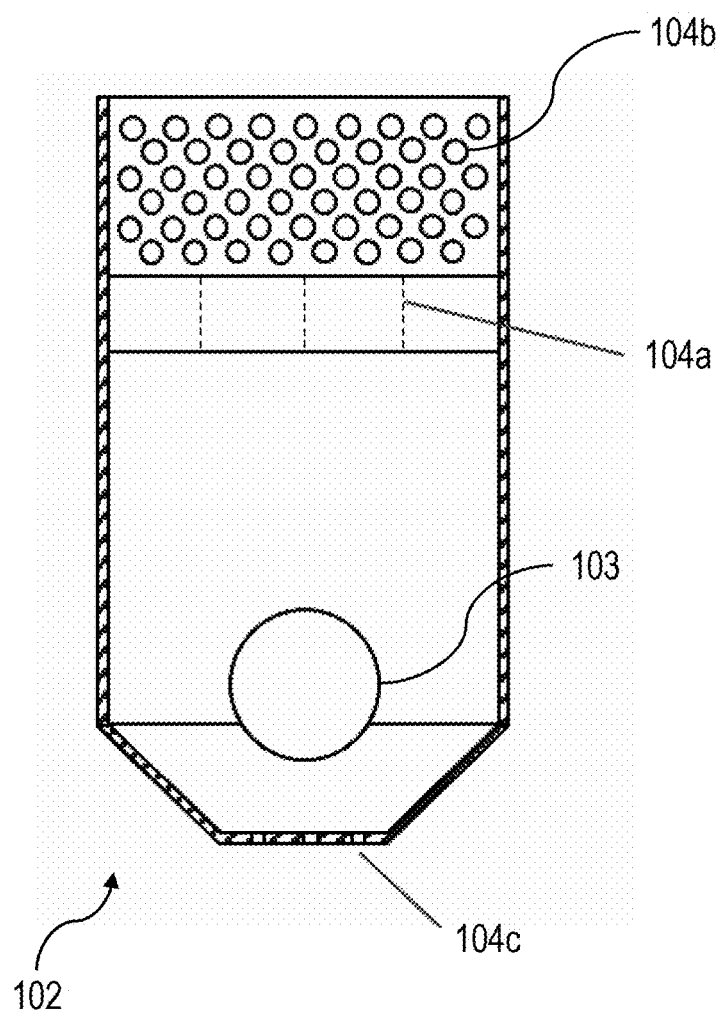
FIG. 2B is a front view of the feed inlet distributor of FIG. 2A.

FIG. 2A is a side view of the feed inlet distributor 102. The feed inlet distributor 102 includes multiple vanes 104a that are disposed within the housing 104. The housing 104 defines multiple perforations 104b. The vanes 104a are configured to direct flow of the feed stream to exit the housing 104 through the perforations 104b. In some implementations, the vanes 104a are vertical vanes. In some implementations, the vanes 104a deviate from the vertical (that is, are angled). In some implementations, some vanes 104a are vertical vanes, and some vanes 104a are angled. The vanes 104a prevent rotation (turbulence) in the flow and directs the fluid flow in a general upward direction toward the perforations 104b. As shown in FIG. 2B, the perforations 104b are located in an upper portion of the housing 102 with respect to gravity. Flow through the perforations 104b facilitates separation of the oil and the water in the feed stream. In some implementations, the perforations 104b have diameters that are in a range of from about 5 millimeters (mm) to about 60 mm. The perforations 104b can be uniform in diameter or vary in diameter. In some implementations, the total open flow area of the perforations 104b in comparison to a cross-sectional area of the housing 104 with respect to general flow direction is in a range of from about 10% to about 50%. The feed inlet distributor 102 is configured to be entirely submerged under the liquid level within the vessel 101.

FIG. 2B is a front view of the feed inlet distributor 102. With respect to the flow of the feed stream, a cross-sectional area of the housing 104 is larger than a cross-sectional area of the inlet pipe 103. In some implementations, the cross-sectional area of the housing 104 is at least double the cross-sectional area of the inlet pipe 103. The larger cross-sectional area of the housing 104 is configured to slow down the flow of the feed stream, thereby facilitating separation of the oil and the water. In some implementations, the housing 104 defines multiple perforations 104c in a lower portion of the housing 102 with respect to gravity. In some implementations, the perforations 104c have diameters that are in a range of from about 1 mm to about 10 mm. The perforations 104c can be uniform in diameter or vary in diameter. These perforations 104c allow for solid material that may be entrained in the feed stream to fall through the perforations 104c instead of accumulating within the housing 104. In such implementations, the outlet of the perforations 104c can be coupled to a solids receptacle or drain (an example is shown in FIGS. 1A and 1B).

Figure 3A:
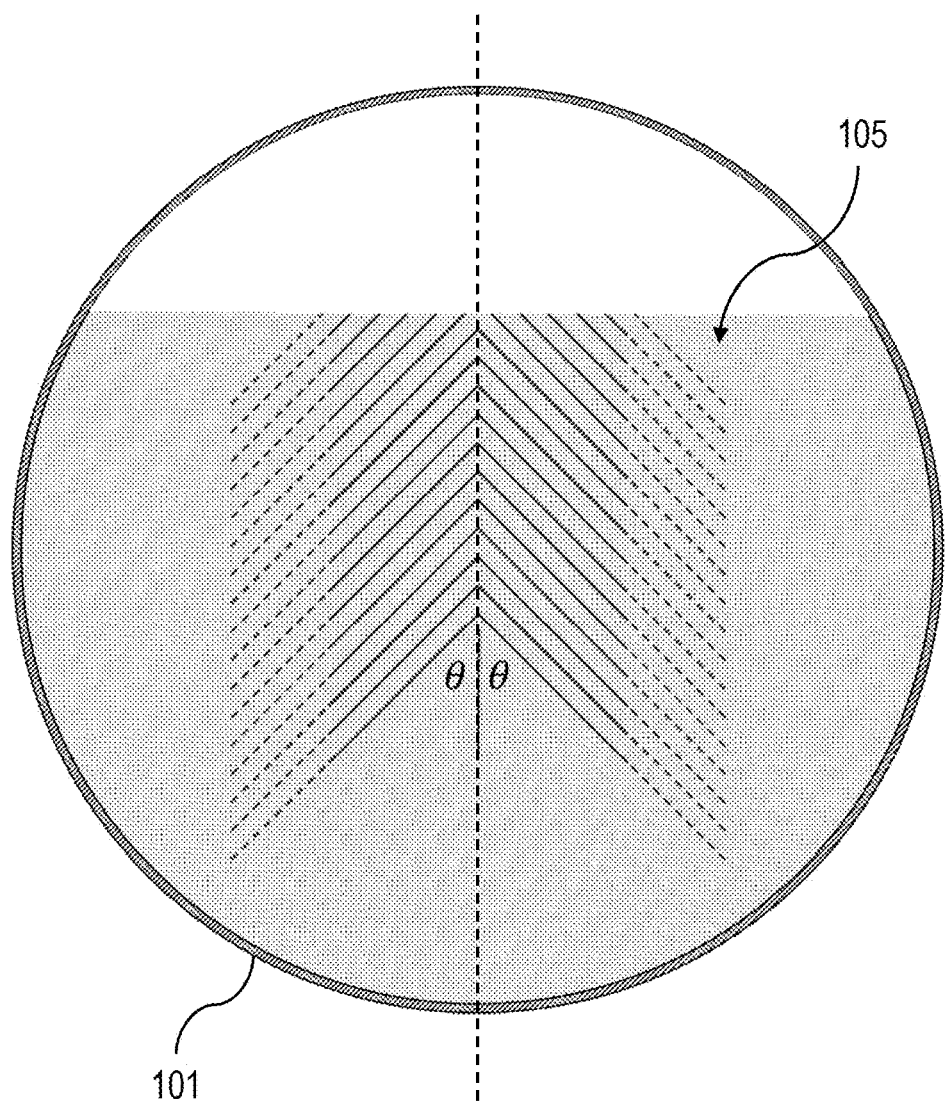
FIG. 3A is a cross-sectional view of an example set of coalescer plates that can be implemented in the phase separator of FIG. 1A.

FIG. 3A is a cross-sectional view of an implementation of the coalescer plates 105 disposed within the vessel 101. In some implementations, as shown in FIG. 3A, the coalescer plates 105 are mirrored across a centerline of the vessel 101. In some implementations, the coalescer plates 105 are parallel to one another. The coalescer plates 105 can be angled with respect to the centerline. For example, the coalescer plates 105 are upwardly sloped with respect to gravity in a direction of fluid flow within the vessel 101. In some implementations, the angle (θ) between each coalescer plate and the centerline is in a range of from about 30 degrees)(° to about 60°. For example, the angle (θ) between each coalescer plate and the centerline is 45°. In some implementations, the vertical spacing between neighboring coalescer plates is the same for all of the coalescer plates 105. The vertical spacing between neighboring coalescer plates can be selected based on various parameters, such as target size range of oil droplets for coalescing. In some implementations, the vertical spacing between neighboring coalescer plates varies in the coalescer plates 105. For example, starting from the bottommost coalescer plate, the vertical spacing between neighboring coalescer plates gradually decreases with each successive coalescer plate. For example, starting from the bottommost coalescer plate, the vertical spacing between neighboring coalescer plates gradually increases with each successive coalescer plate.

The relationship between pressure drop of fluid flowing across the coalescer plates 105 is inversely proportional to the spacing between neighboring coalescer plates. For example, as the spacing between neighboring coalescer plates decreases, the pressure drop across the neighboring coalescer plates increases.

Figure 3B:
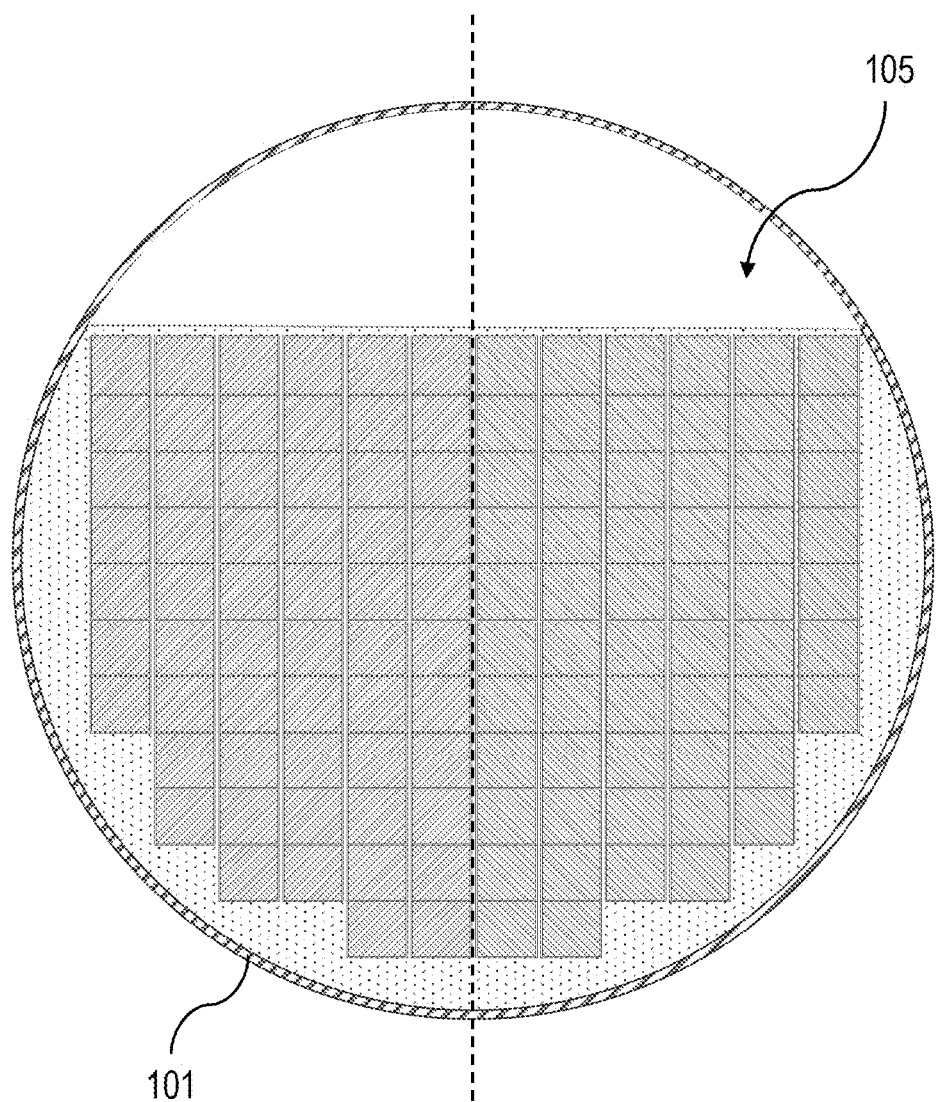
FIG. 3B is a cross-sectional view of an example set of coalescer plates that can be implemented in the phase separator of FIG. 1A.
Figure 3C:
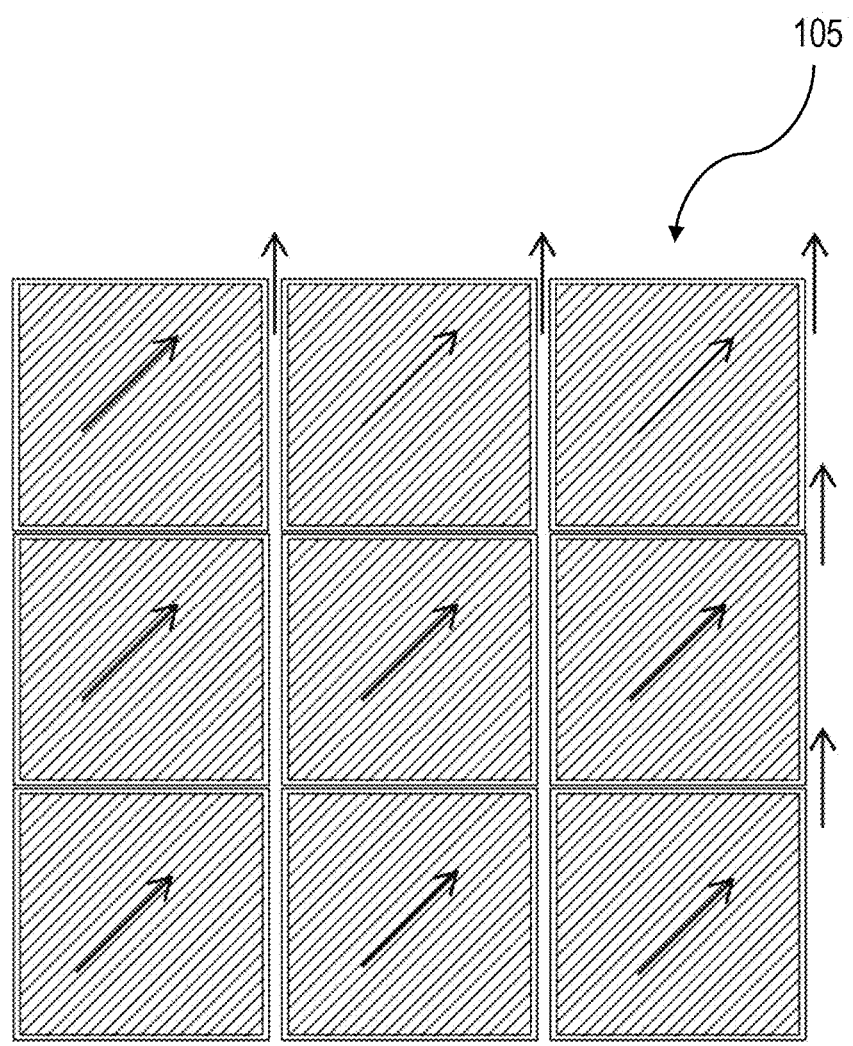
FIG. 3C is a cross-sectional view of an example set of coalescer plates that can be implemented in the phase separator of FIG. 1A.

FIG. 3B is a cross-sectional view of an implementation of the coalescer plates 105 disposed within the vessel 101. In some implementations, as shown in FIG. 3B, the coalescer plates 105 includes multiple rectangular units of coalescer plates distributed within the vessel 101. Each rectangular units of coalescer plates includes its own set of coalescer plates that are angled with respect to the centerline. In some implementations, each set of coalescer plates 105 include equally spaced (that is, vertically distributed evenly) coalescer plates. In some implementations, each set of coalescer plates 105 include coalescer plates that vary in vertical distribution. In some implementations, the vertical spacing between coalescer plates 105 is the same among the sets of coalescer plates. In some implementations, the vertical spacing between coalescer plates 105 vary among the sets of coalescer plates. For example, a first set of coalescer plates 105 can include coalescer plates with 20 millimeter (mm) vertical spacing between adjacent coalescer plates, and a second set of coalescer plates 105 positioned above the first set of coalescer plates (within the vessel 101 with respect to gravity) can include coalescer plates with 40 mm vertical spacing between adjacent coalescer plates. Similar to the configuration shown in FIG. 3A, the coalescer plates 105 in the configuration shown in FIG. 3B are mirrored across the centerline of the vessel 101. FIG. 3C shows a portion of the implementation shown in FIG. 3B, along with arrows representing general direction of fluid (oil) flow through the coalescer plates 105.

Figure 3D:
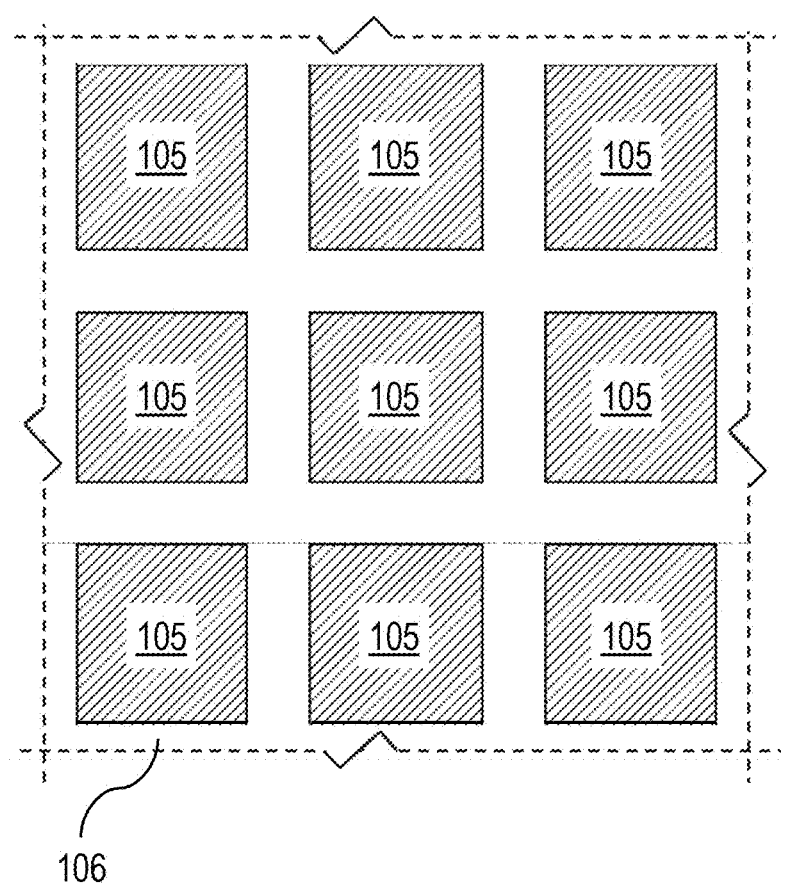
FIG. 3D is a schematic diagram of an example configuration of multiple sets of coalescer plates.

FIG. 3D is a schematic diagram of an example configuration of multiple sets of coalescer plates 105. In some implementations, the sets of coalescer plates 105 are mounted to a lattice plate 106. The lattice plate 106 holds the sets of coalescer plates 105 in their separate locations and also prevents upstream flow of oil water disturbing oily water from rising between sets of coalescer plates 105. The lattice plate 106 can prevent ingress of water into the vertical channels between neighboring sets of coalescer plates 105. For example, the lattice plate 106 prevents upstream fluid from interfering with oil droplet coalescence between horizontally adjacent sets of coalescer plates 105 with respect to the general direction of fluid flow within the vessel 101.

Figure 3E:
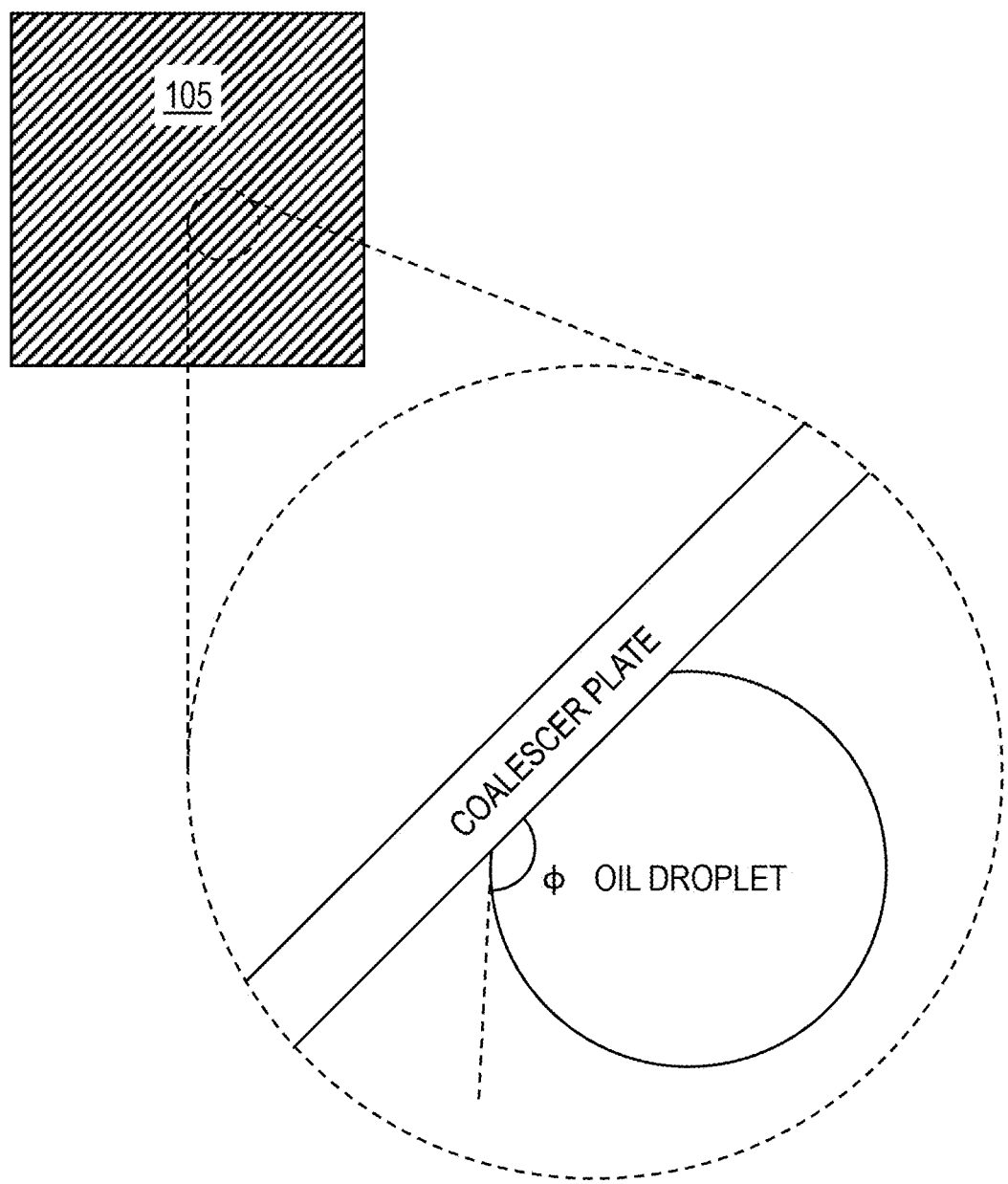
FIG. 3E is a schematic diagram of an example oil droplet on a coalescer plate.

FIG. 3E is a zoomed schematic view of an example oil droplet on a coalescer plate. In some implementations, the coalescer plates 105 are made from a metal, such as stainless steel or duplex stainless steel, or a polymer, such as polypropylene. In some implementations, the coalescer plates 105 are treated or formed of a material that makes the coalescer plates oleophobic and non-wetting to oil, such that the contact angle (φ) between an oil droplet and a coalescer plate is greater than 90°. In some implementations, the contact angle (φ) between an oil droplet and a coalescer plate is greater than 150°. This condition reduces the contact area between the oil droplet and the coalescer plate, reduces the resistance of the oil droplet from moving along the surface of the coalescer plate, and reduces the apparent stickiness of the droplet to the surface of the coalescer plate, thereby making cleaning during periodic maintenance easier. In some implementations, the coalescer plates 105 include flat coalescer plates. In some implementations, the coalescer plates 105 include corrugated coalescer plates.

Figure 4A:
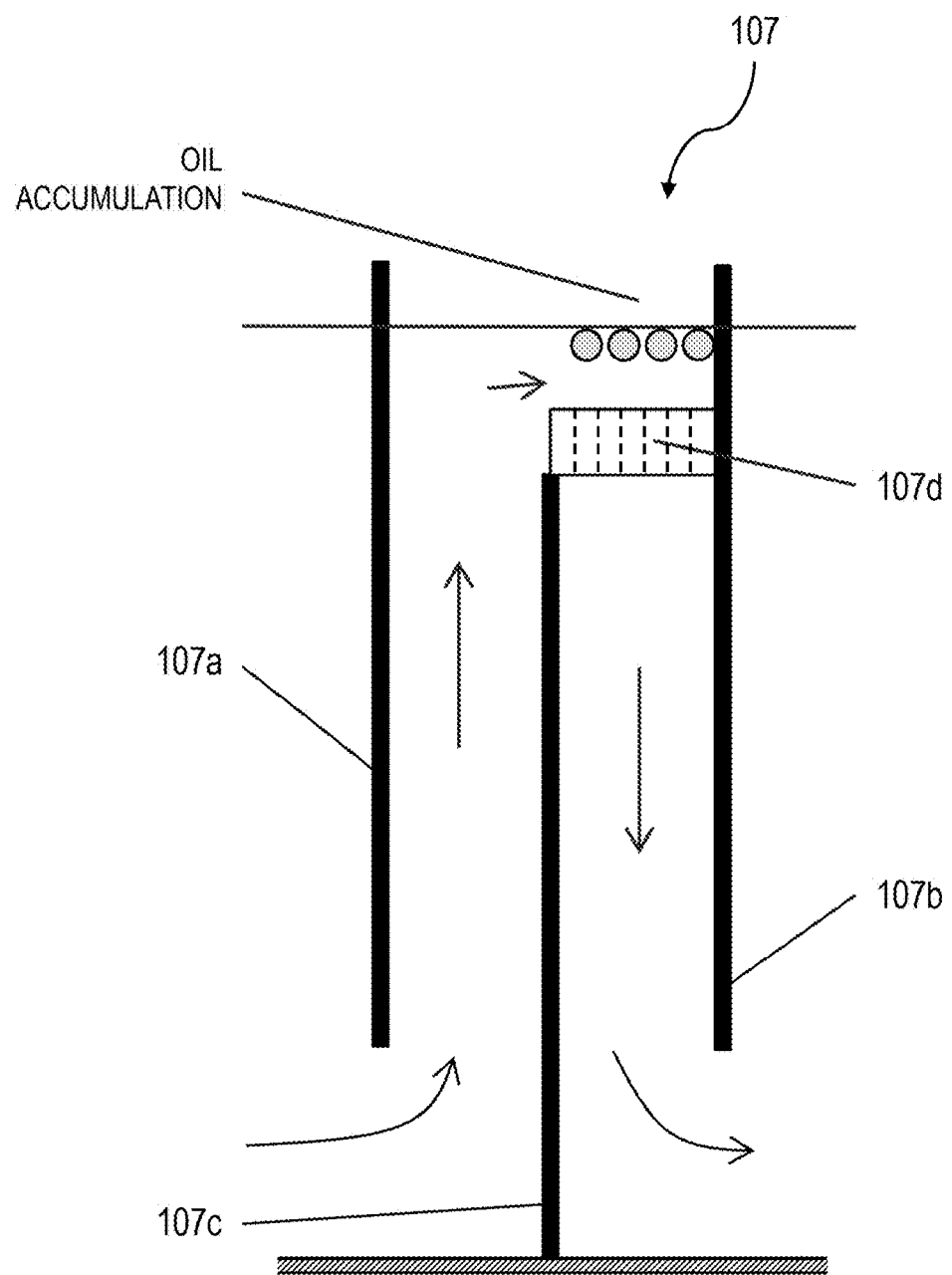
FIG. 4A is a schematic diagram of an example set of baffles that can be implemented in the phase separator of FIG. 1A.

FIG. 4A is a schematic diagram of an example set of baffles 107. In some implementations, the spacing between the first underflow baffle 107a and the overflow baffle 107c is substantially the same as the spacing between the overflow baffle 107c and the second underflow baffle 107b. In some implementations, the second underflow baffle 107b defines perforations. For example, the second underflow baffle 107b can be in the form of a porous or perforated plate or an expanded metal screen. In some implementations, the second underflow baffle 107b defines vertical slots, horizontal slots, or both. The open flow area of the second underflow baffle 107b (whether it be made up of perforations, slots, mesh, or a combination of these) allows for fluid to flow under the second underflow baffle 107b or flow through the second underflow baffle 107b. Such open flow area can be implemented in the second underflow baffle 107b in implementations where longitudinal length of the vessel 101 is limited (for example, in retrofit applications). In some implementations, the baffles of the set of baffles 107 are made from a metal, such as stainless steel or duplex stainless steel, or a polymer, such as polypropylene. In some implementations, the baffles of the set of baffles 107 are treated or formed of a material that makes the set of baffles 107 oleophobic and non-wetting to oil, such that the contact angle between an oil droplet and a baffle (107a, 107b, or 107c) is greater than 90° (similar to the coalescer plates 105).

In some implementations, the oil-water separation system 100 includes guide vanes 107d. In some implementations, as shown in FIG. 4A, the guide vanes 107d are disposed between the first underflow baffle 107a and the second underflow baffle 107b and also above the overflow baffle 107c. The guide vanes 107d are configured to be submerged below a liquid level within the vessel 101. In some implementations, the guide vanes 107d are submerged below the upper fluid layer of oil within the vessel 101. In some implementations, as shown in FIG. 4A, the guide vanes 107d span from the overflow baffle 107c to the second underflow baffle 107b.

Figure 4B:
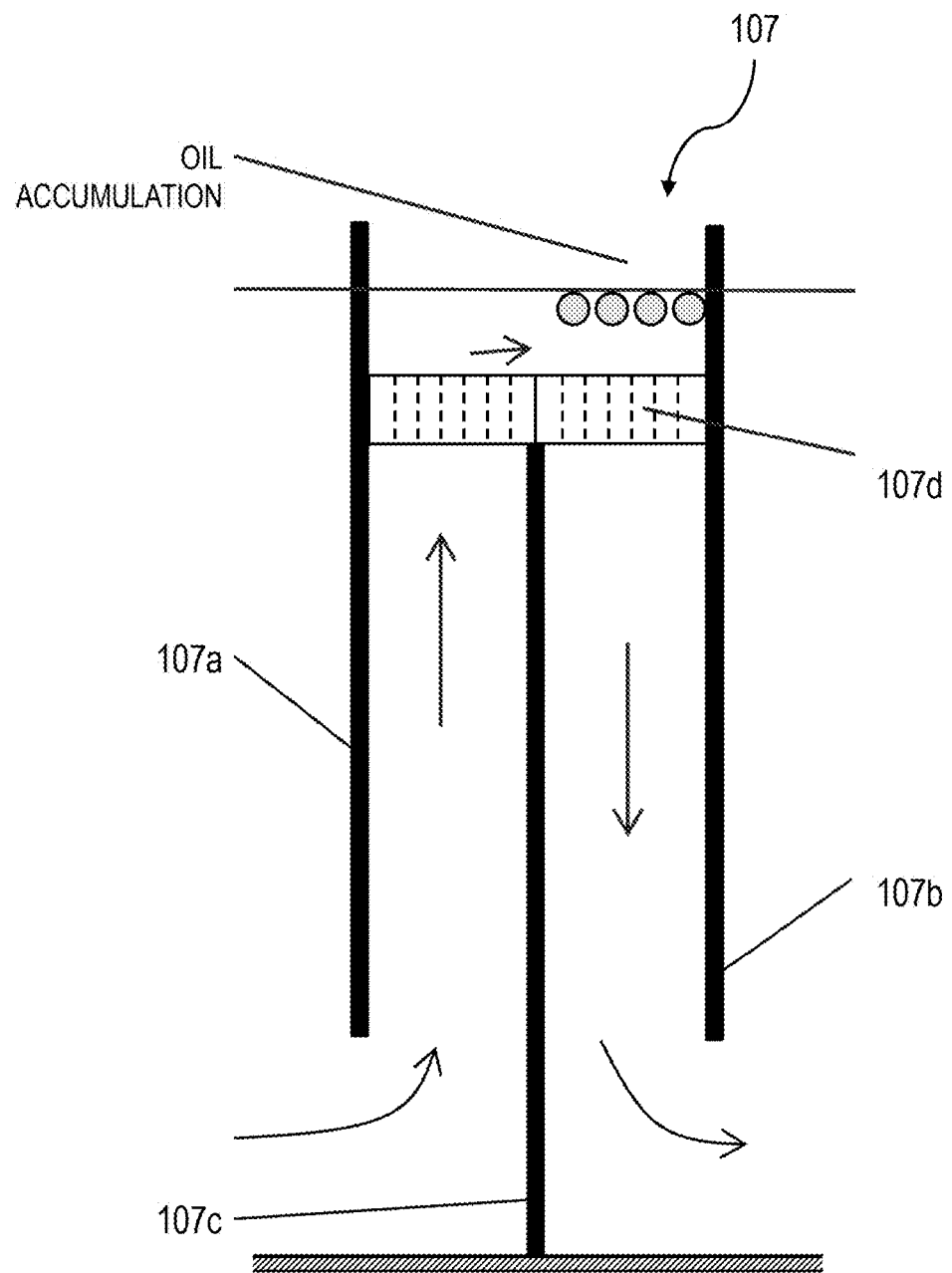
FIG. 4B is a schematic diagram of an example set of baffles that can be implemented in the phase separator of FIG. 1A.

FIG. 4B is a schematic diagram of an example set of baffles 107. The set of baffles 107 shown in FIG. 4B is substantially similar to the set of baffles 107 shown in FIG. 4A. In some implementations, as shown in FIG. 4B, the guide vanes 107d span from the first underflow baffle 107a to the second underflow baffle 107b.

Figure 4C:
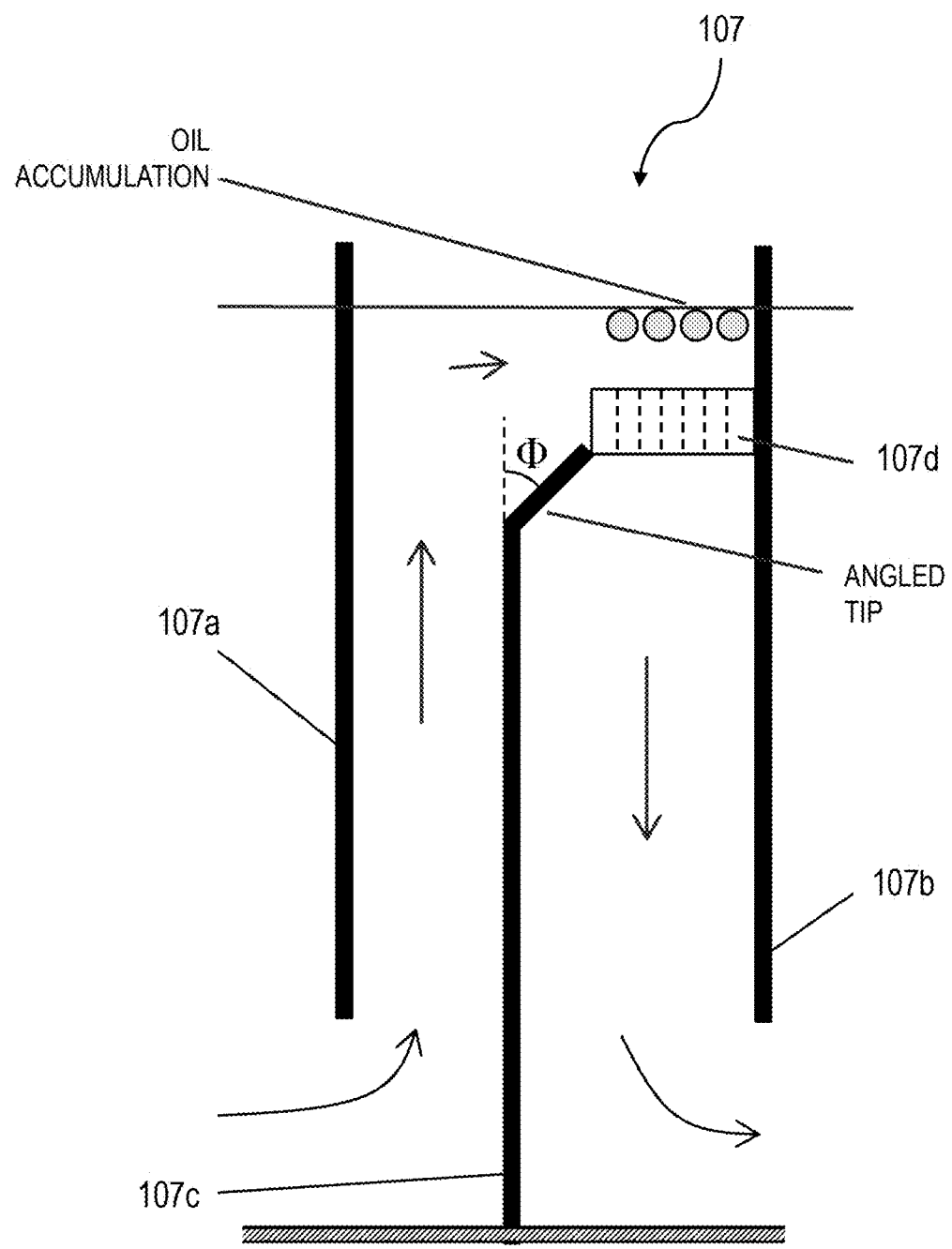
FIG. 4C is a schematic diagram of an example set of baffles that can be implemented in the phase separator of FIG. 1A.

FIG. 4C is a schematic diagram of an example set of baffles 107. The set of baffles 107 shown in FIG. 4C is substantially similar to the set of baffles 107 shown in FIG. 4A. In some implementations, as shown in FIG. 4C, the overflow baffle 107c includes an angled tip. In some implementations, the angled tip of the overflow baffle 107c has an angle ($\Psi$) in a range of from 0° to 45° deviating from the vertical. The angled tip can increase the cross-sectional area for fluid flow and can also facilitate a reduction in fluid flow velocity as the fluid upwardly flows and approaches the liquid surface within the vessel 101. Flow deceleration can promote oil droplet disengagement and facilitate oil skimming. This is in contrast to straight baffles (0° deviation from the vertical) which can cause flow separation, wall detachment, formation of eddies, or a combination of these, all of which can disrupt oil droplet disengagement.

Figure 4D:
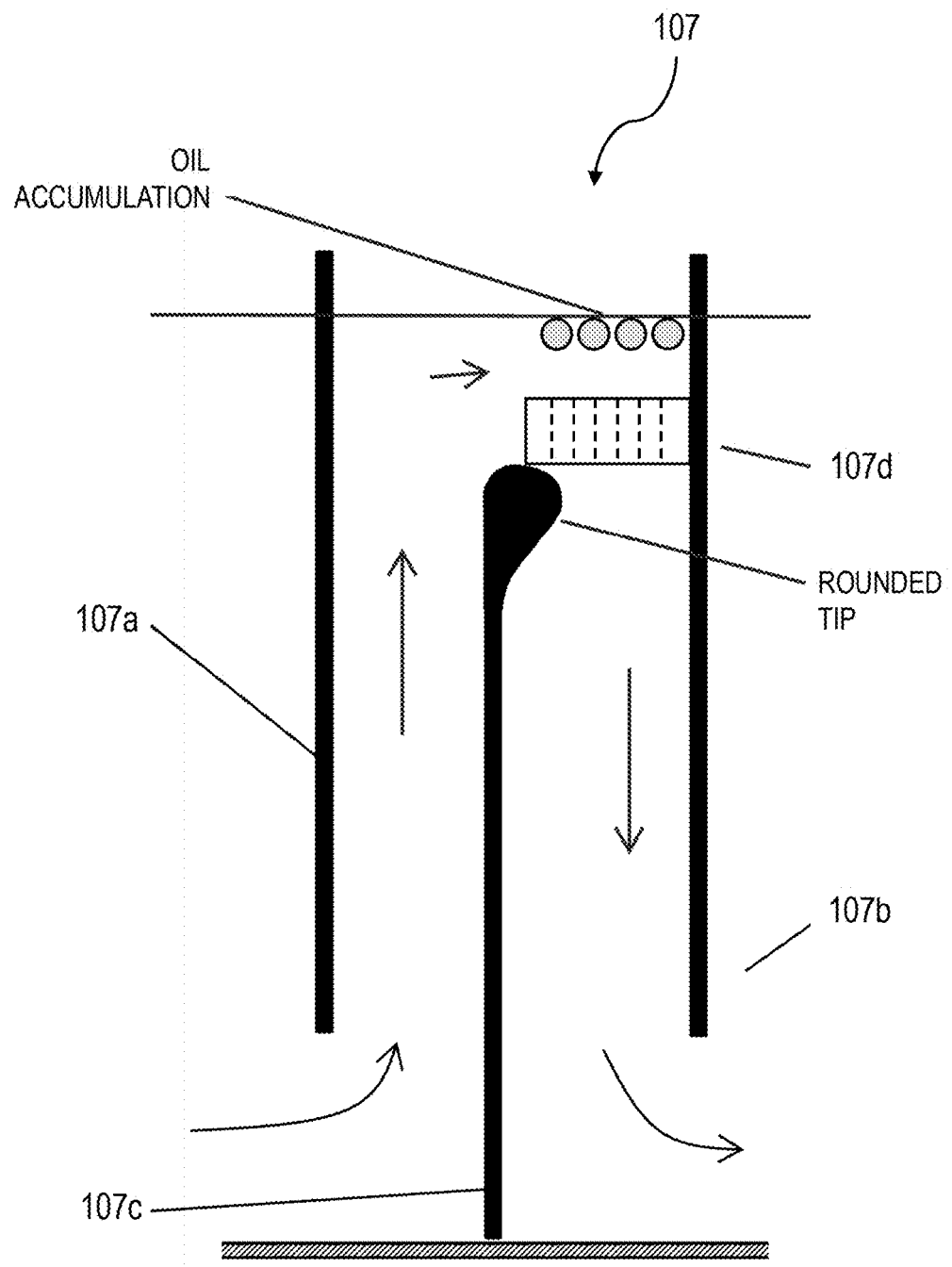
FIG. 4D is a schematic diagram of an example set of baffles that can be implemented in the phase separator of FIG. 1A.

FIG. 4D is a schematic diagram of an example set of baffles 107. The set of baffles 107 shown in FIG. 4D is substantially similar to the set of baffles 107 shown in FIG. 4A. In some implementations, as shown in FIG. 4D, the overflow baffle 107c includes a rounded tip. The rounded tip provides a smooth area transition to mitigate flow separation around the tip of the overflow baffle 107c and can facilitate smooth fluid flow to the guide vanes 107d.

Figure 4E:
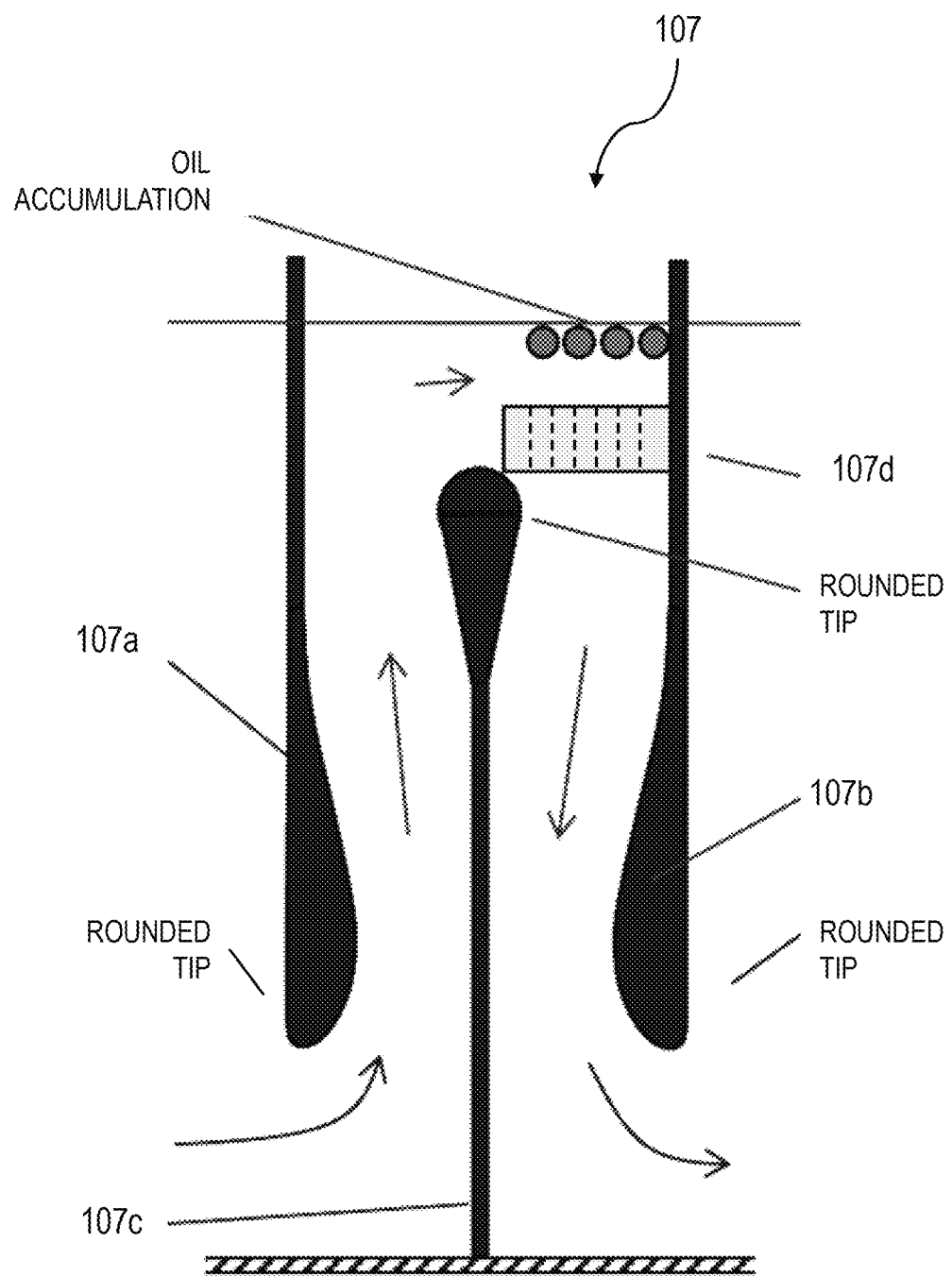
FIG. 4E is a schematic diagram of an example set of baffles that can be implemented in the phase separator of FIG. 1A.

FIG. 4E is a schematic diagram of an example set of baffles 107. The set of baffles 107 shown in FIG. 4E is substantially similar to the set of baffles 107 shown in FIG. 4A. In some implementations, as shown in FIG. 4E, each of the first underflow baffle 107a, the second underflow baffle 107b, and the overflow baffle 107c include rounded tips. The rounded tips of the baffles 107 can facilitate smooth fluid flow around these baffles 107.

Figure 5A:
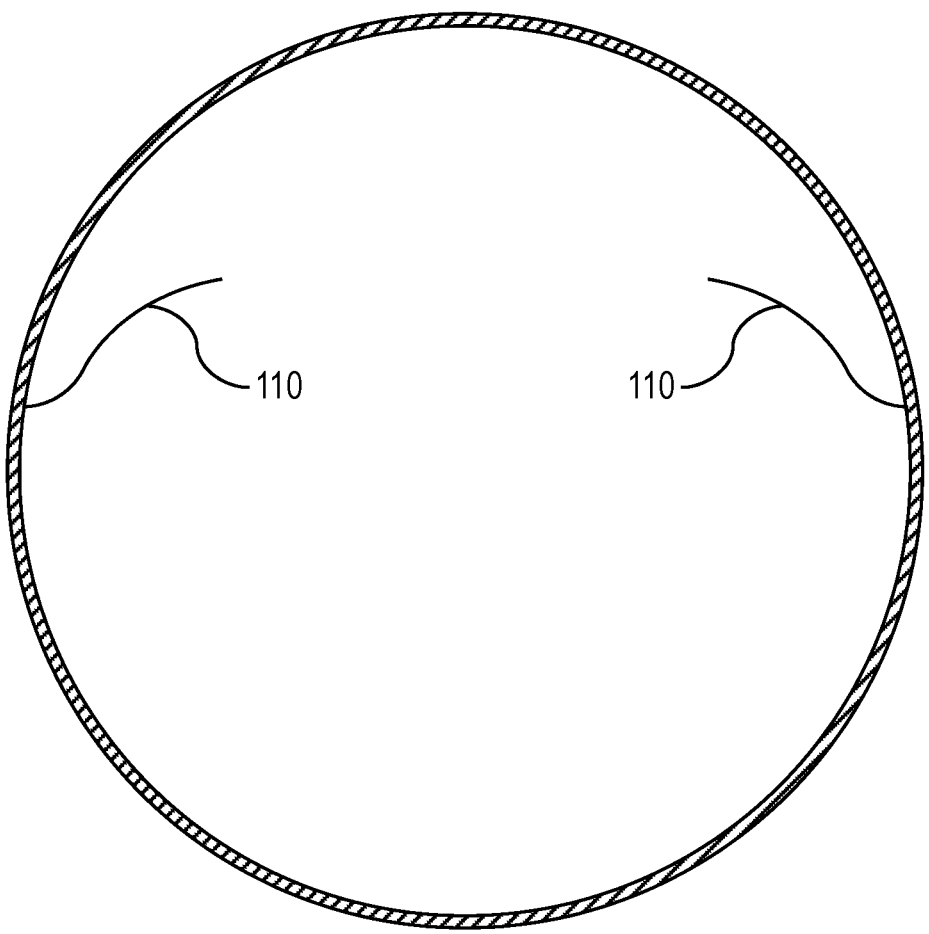
FIG. 5A is a cross-sectional view of an example oil skimming trough that can be implemented in the phase separator of FIG. 1A.
Figure 5B:
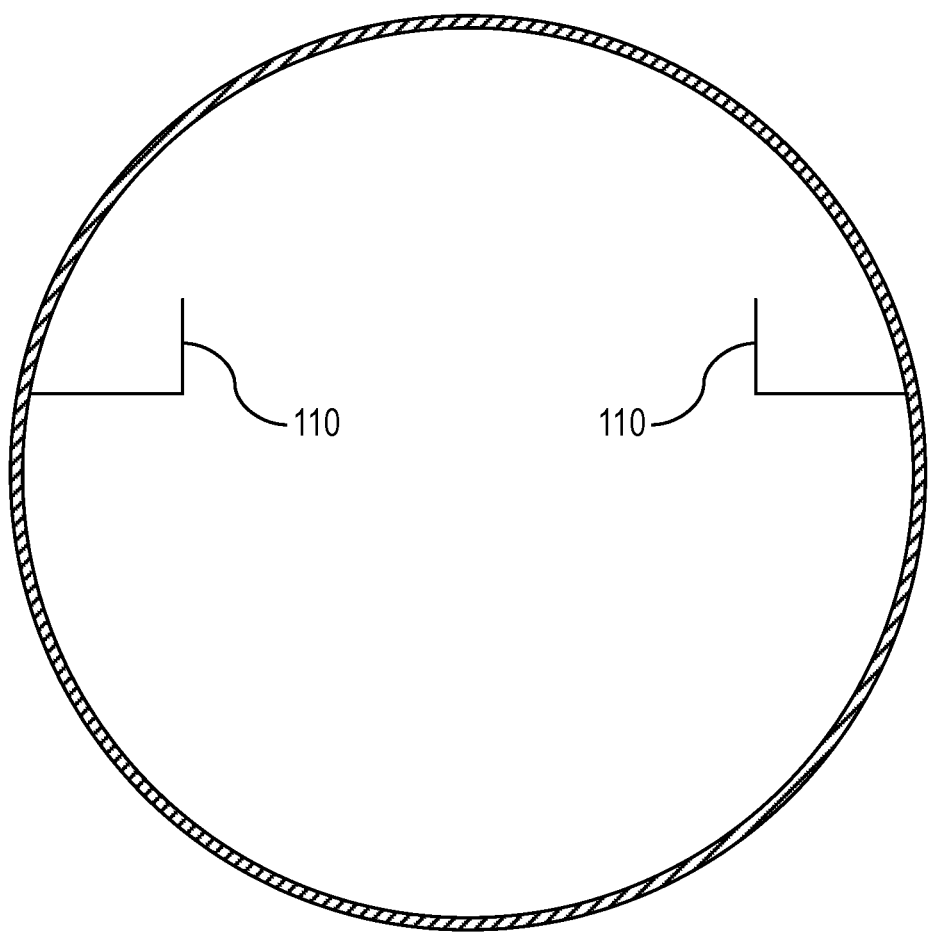
FIG. 5B is a cross-sectional view of an example oil skimming trough that can be implemented in the phase separator of FIG. 1A.

FIG. 5A is a cross-sectional view of an implementation of the oil skimming trough 110. As shown in FIG. 5A, the oil-water separation system 100 can include multiple oil skimming troughs 110, for example, two oil skimming troughs 110. The oil skimming troughs 110 are downwardly sloped with respect to gravity toward an inner surface of the vessel 101. In some implementations, each oil skimming trough 110 includes curved portions that gradually slope toward the inner surface of the vessel 101. The oil skimming trough 110 can include an outlet near the bottom of the oil skimming trough 110 for discharging oil from the vessel 101. In some implementations, the outlet discharges to an oil collection reservoir located in a head of the vessel 101. In some cases, some water may exit the vessel 101 along with the oil from the outlet of the oil skimming trough 110. In some implementations, each oil skimming trough 110 spans longitudinally within the vessel 101 over an area that covers (that is, overlaps with) the housing 104 and the module 150 (which includes the coalescer plates 105 and the set of baffles 107). In some implementations, the oil skimming trough 110 is made from a metal, such as stainless steel or duplex stainless steel, or a polymer, such as polypropylene. FIG. 5B is a cross-sectional view of an implementation of the oil skimming trough 110. The oil skimming troughs 110 of FIG. 5B are substantially similar to those of FIG. 5A, but have a different shape.

Figure 6A:
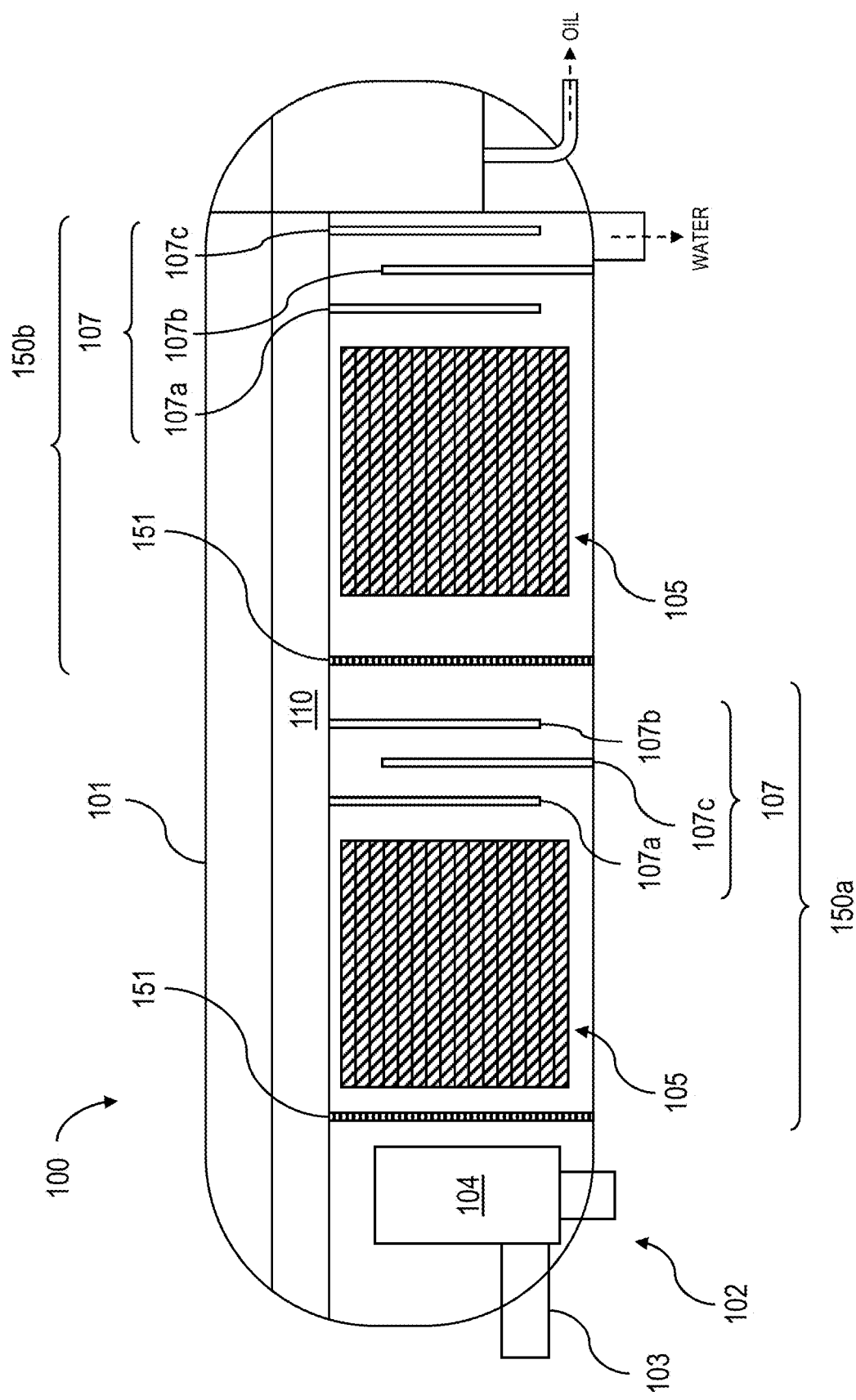
FIG. 6A is a schematic diagram of an example phase separator.

FIG. 6A is a schematic diagram of an implementation of the oil-water separation system 100. The oil-water separation system 100 shown in FIG. 6A is substantially similar to the implementation shown in FIGS. 1A and 1B, but includes duplicates of some components. For example, the oil-water separation system 100 in FIG. 6A includes multiple modules 150 (first module 150a and second module 150b). The second module 150b is downstream of the first module 150a. Although shown in FIG. 6A as including two modules 150, the oil-water separation system 100 can include additional modules 150, such as three or more modules 150. The same applies to any of the aforementioned components of the oil-water separation system 100. That is, the oil-water separation system 100 can include additional feed inlet distributor(s) 102, additional oil skimming trough(s) 110, or both.

Figure 6B:
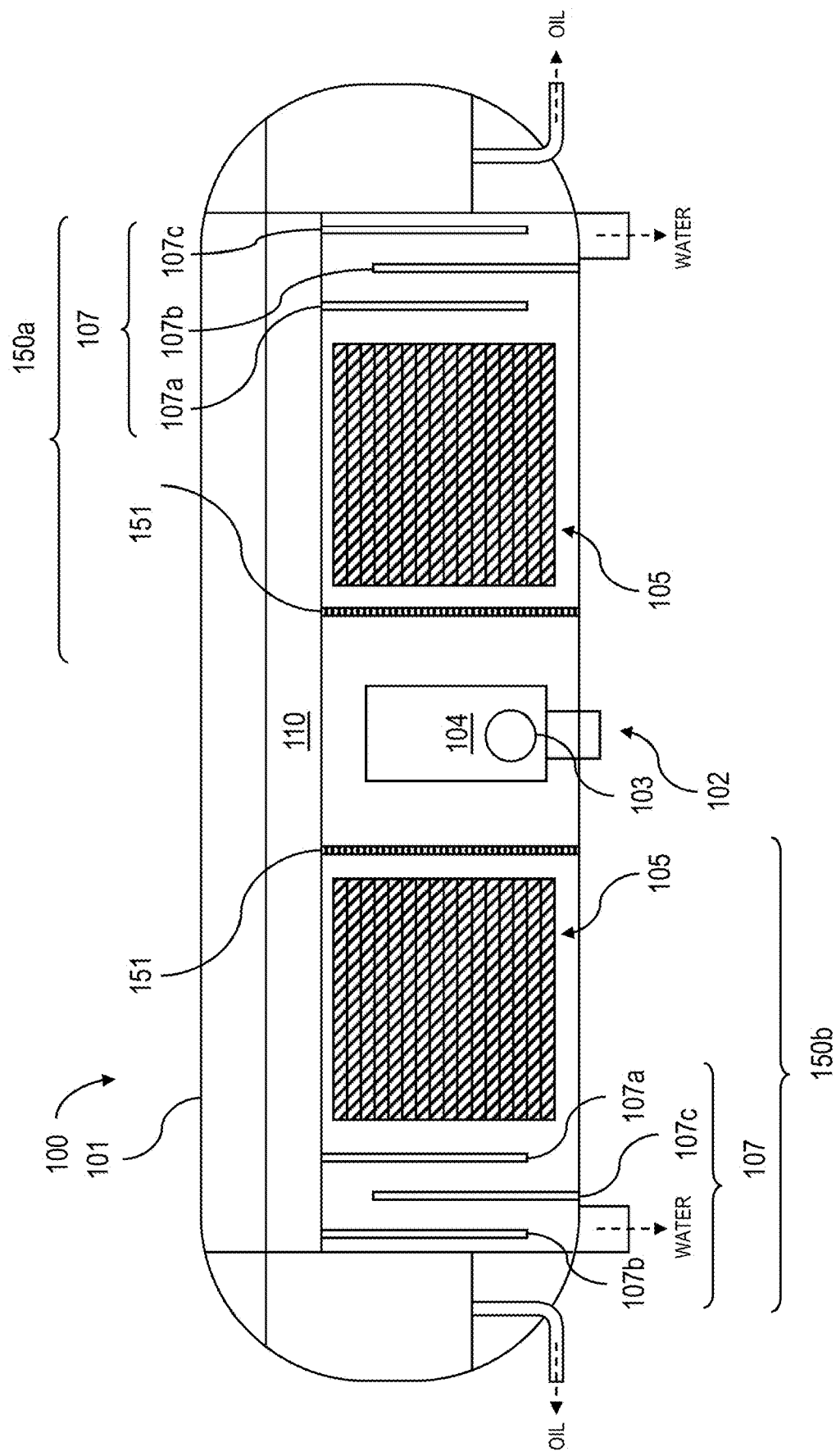
FIG. 6B is a schematic diagram of an example phase separator.

FIG. 6B is a schematic diagram of an implementation of the oil-water separation system 100. The oil-water separation system 100 shown in FIG. 6B is substantially similar to the implementation shown in FIG. 6A, but the placement of various components vary. For example, the oil-water separation system 100 in FIG. 6B includes multiple modules 150 (first module 150a and second module 150b) that are disposed at opposite sides of the feed inlet distributor 102. In such implementations, the second module 150b is not considered to be downstream of the first module 150a (as is the case for the oil-water separation system 100 in FIG. 6A). Instead, the general flow of fluid through the oil-water separation system 100 in FIG. 6B is generally from the middle of the oil-water separation system 100 out to the sides. Although shown in FIG. 6B as including two modules (150a, 150b), the oil-water separation system 100 can include additional modules 150, such as three or more modules 150. The same applies to any of the aforementioned components of the oil-water separation system 100. That is, the oil-water separation system 100 can include additional feed inlet distributor(s) 102, additional oil skimming trough(s) 110, or both.

Figure 6C:
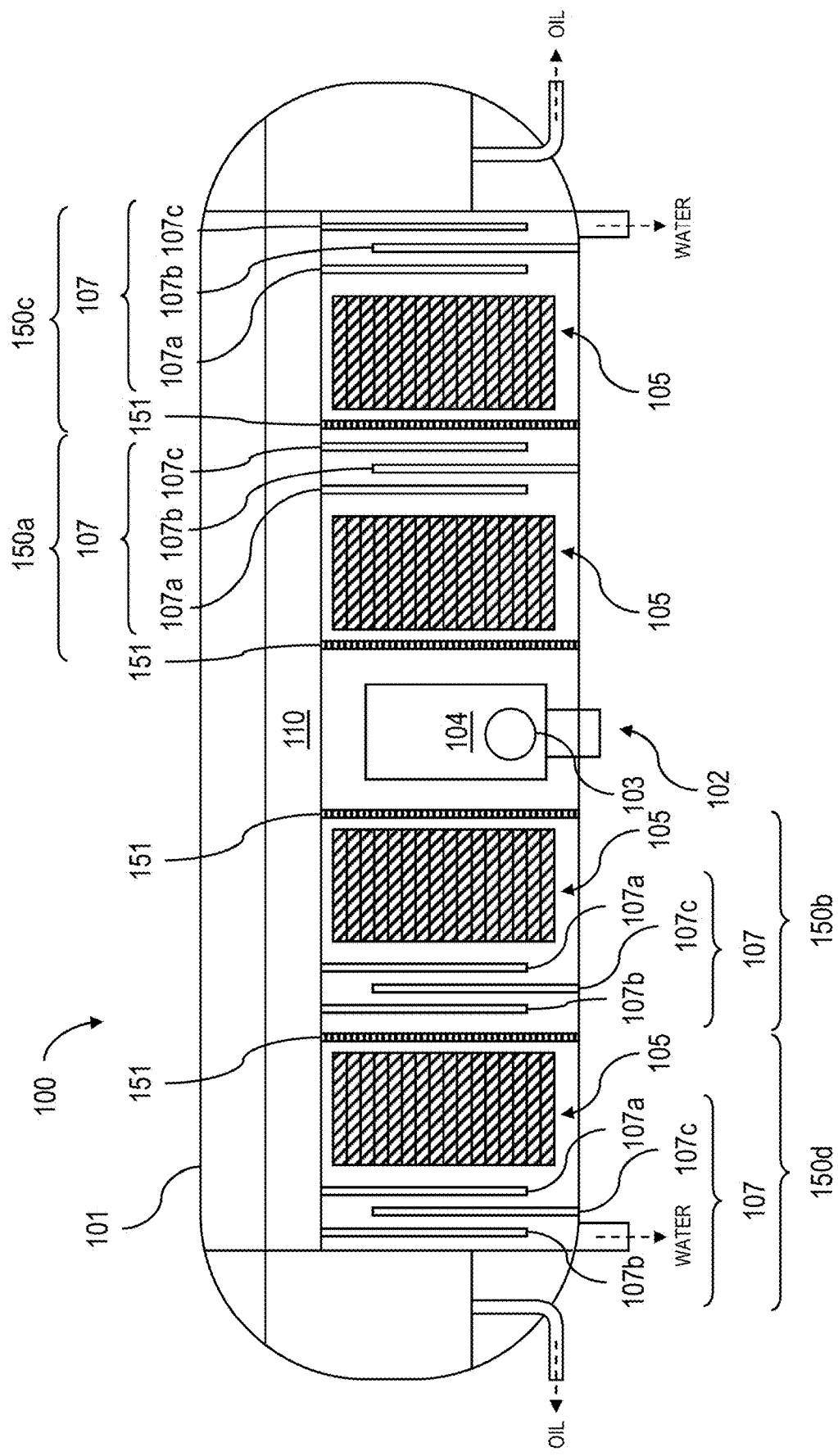
FIG. 6C is a schematic diagram of an example phase separator.

FIG. 6C is a schematic diagram of an implementation of the oil-water separation system 100. The oil-water separation system 100 shown in FIG. 6C is substantially similar to the implementations shown in FIG. 6B, but includes duplicates of some components. For example, the oil-water separation system 100 can include a third module 150c downstream of first module 150a and a fourth module 150d downstream of the second module 150b. In such implementations, about half of the fluid entering the oil-water separation system 100 would flow through the first module 150a and then the third module 150c, and the other half of the fluid entering the oil-water separation system 100 would flow through the second module 150b and then the fourth module 150d. Although shown in FIG. 6C as including four modules (150a, 150b, 150c, 150d), the oil-water separation system 100 can include additional modules 150, such as five or more modules 150. The same applies to any of the aforementioned components of the oil-water separation system 100. That is, the oil-water separation system 100 can include additional feed inlet distributor(s) 102, additional oil skimming trough(s) 110, or both.

Figure 7A:
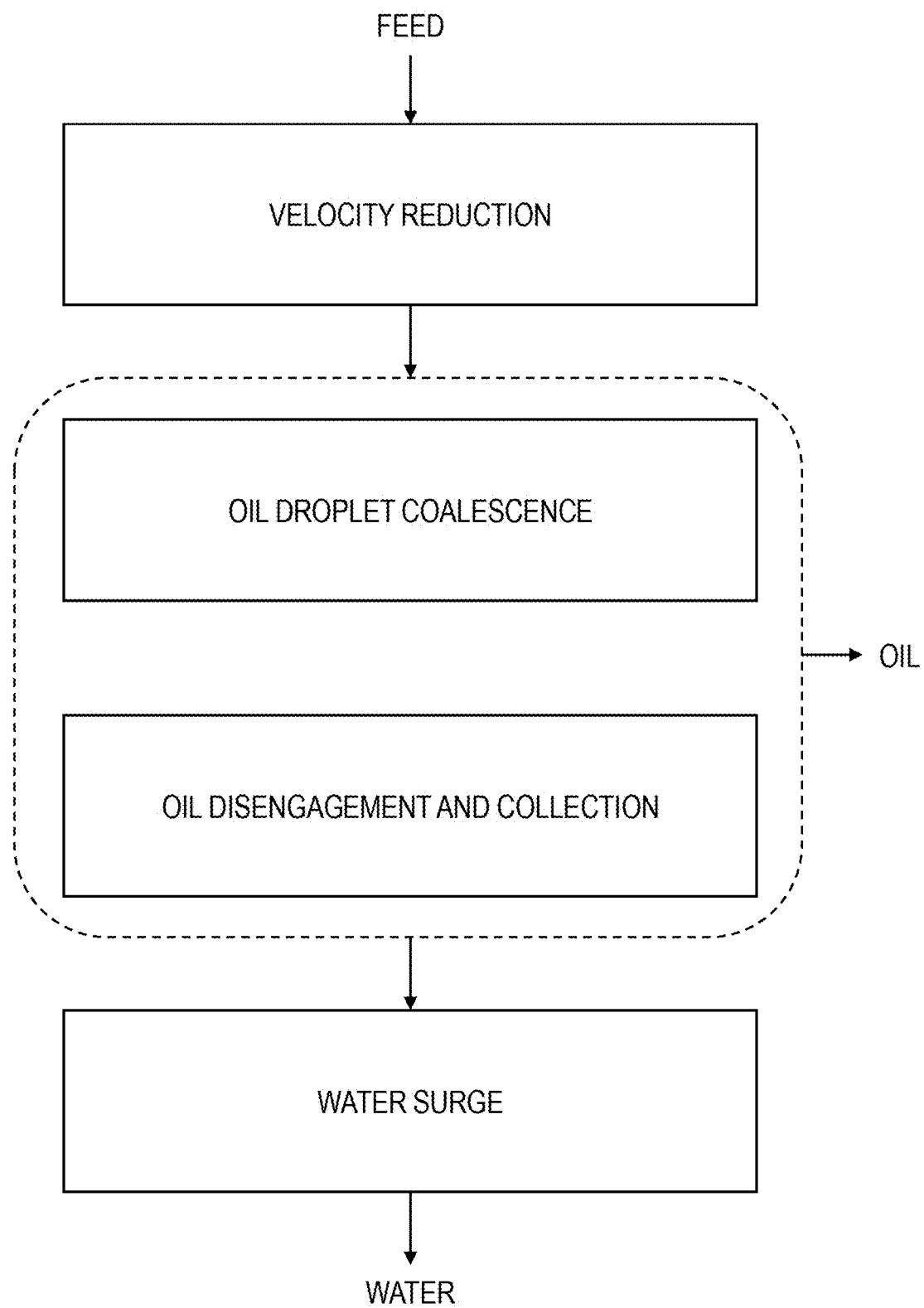
FIG. 7A is a flow chart representing the flow and functions of the phase separator of FIG. 1A.

FIG. 7A is a flow chart representing the flow and functions of the oil-water separation system 100. A feed stream including oil and water is flowed to the oil-water separation system 100. The feed stream can include, for example, oil droplets dispersed in a bulk water phase. In some implementations, the feed stream includes up to 10 vol. % of oil.

The velocity of the feed stream is reduced, for example, by the feed inlet distributor 102. The oil droplets are coalesced, for example, by the coalescer plates 105. The oil is disengaged and collected, for example, by the set of baffles 107 and the oil skimming trough 110. The collected oil is discharged from the oil-water separation system 100. The oil-water separation system 100 can include a surge compartment for holding the water separated from the feed stream. The surge compartment can be located within the vessel 101 downstream of the module 150. In implementations that include multiple modules 150, the surge compartment can be located downstream of the final module 150 with respect to the general direction of fluid flow through the vessel 101. The water can be discharged from the oil-water separation system 100. In some implementations, the water discharged from the oil-water separation system 100 has an oil concentration that is less than 100 ppm. In some implementations, the water discharged from the oil-water separation system 100 has an oil concentration that is less than 50 ppm.

Figure 7B:
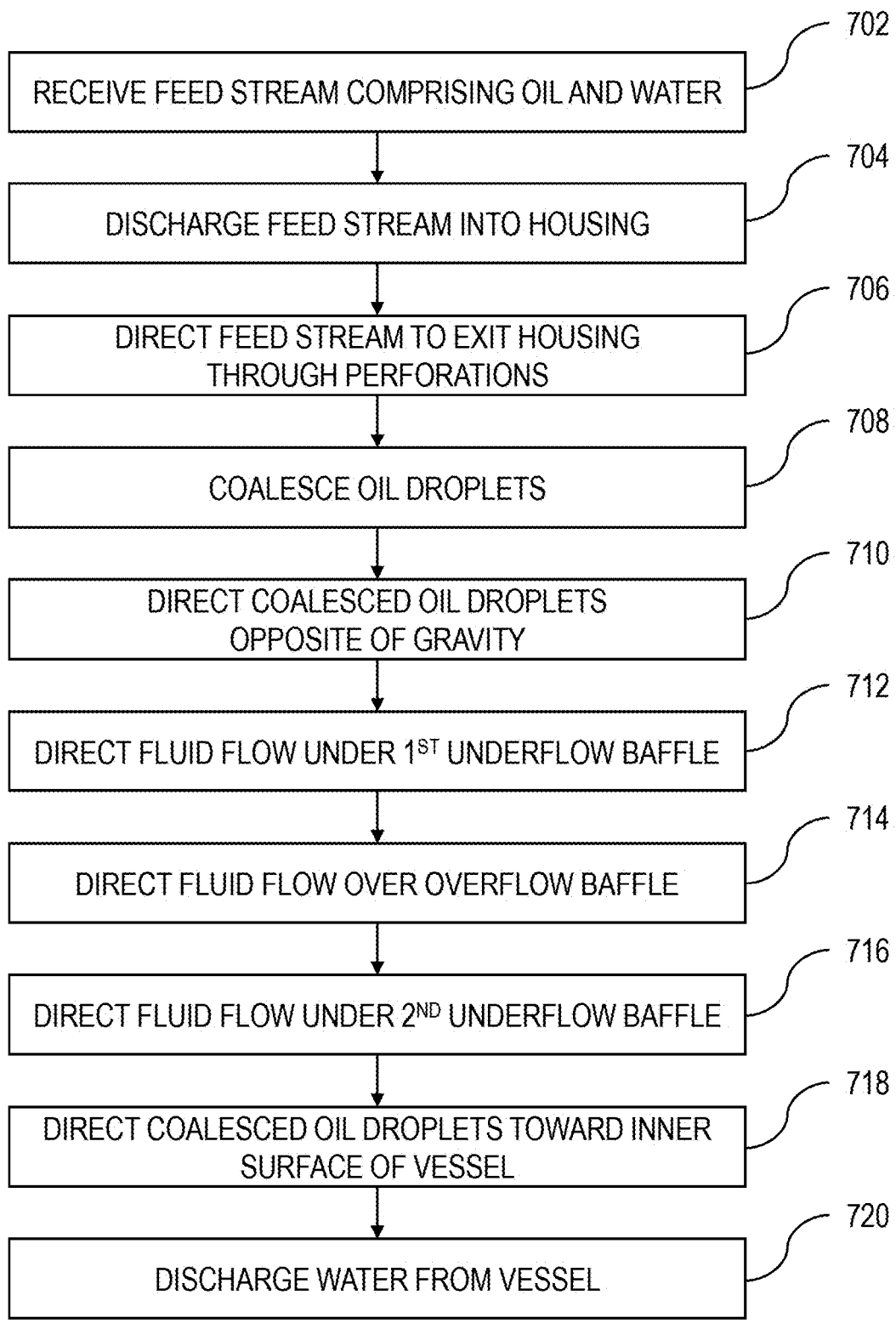
FIG. 7B is a flow chart of an example method for phase separation.

FIG. 7B is a flow chart of an example method 700 for phase separation. The method 700 can be implemented by the oil-water separation system 100. At step 702, a feed stream including oil and water is received by an inlet pipe, for example, the inlet pipe 103 of the feed inlet distributor 102.

At step 704, the feed stream is discharged from an outlet of the inlet pipe 103 into a housing, for example, the housing 104 of the feed inlet distributor 102. As mentioned previously, the housing 104 is disposed within the vessel 101 and has a cross-sectional area that is larger than the cross-sectional area of the inlet pipe 103 in relation to the direction of fluid flow.

At step 706, the feed stream is directed by vanes, for example, the vanes 104a, to exit the housing 104 through perforations defined by the housing 104, for example, the perforations 104b. As mentioned previously, the vanes 104a are disposed within the housing 104.

At step 708, coalescing the oil droplets by coalescer plates, for example, the coalescer plates 105 disposed within the vessel 101 downstream of the housing 104. The coalescer plates 105 receive the oil droplets, and the oil droplets coalesce together while traveling across the surfaces of the coalescer plates 105.

At step 710, directing the coalesced oil droplets in an upwardly sloped direction that opposes gravity. Step 710 can be performed by the coalescer plates of the first module 105.

At step 712, fluid flow is directed under a baffle, for example, the first underflow baffle 107a disposed within the vessel 101 downstream of the coalescer plates 105.

At step 714, fluid flow is directed over a baffle, for example, the overflow baffle 107c disposed within the vessel 101 downstream of the first underflow baffle 107a.

At step 716, fluid flow is directed under a baffle, for example, the second underflow baffle 107b disposed within the vessel 101 downstream of the overflow baffle 107c. In some implementations, a portion of the fluid flow is directed through the second underflow baffle 107b, for example, in implementations where the second underflow baffle 107b has open flow area (such as perforations, slots, or both).

In some implementations, steps 708, 710, 712, 714, and 716 are repeated based on the number of modules 150 present within the oil-water separation system 100. For example, steps 708, 710, 712, 714, and 716 are repeated for each additional module 150 present within the oil-water separation system 100. Each progression of steps 708, 710, 712, 714, and 716 can be considered a progression through a module 150 of oil-water separation within the oil-water separation system 100.

At step 718, the coalesced oil droplets are directed toward an inner surface of the vessel 101, for example, by the oil skimming trough 110 that is disposed within the vessel 101 and downwardly sloped with respect to gravity toward the inner surface of the vessel 101.

At step 720, the water (separated from the feed stream) is discharged from the vessel 101. In some implementations, the water discharged from the vessel 101 at step 720 has an oil concentration that is less than 100 ppm. In some implementations, the water discharged from the vessel 101 at step 720 has an oil concentration that is about 50 ppm.

Any step of method 700 can occur simultaneously with any of the other steps of method 700. Any step of method 700 can be repeated to achieve a desired level of oil-water separation within the oil-water separation system 100.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y"

has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An oil-water separation system comprising:
   a vessel comprising a feed inlet distributor, the feed inlet distributor comprising:
      an inlet pipe configured to receive a feed stream comprising oil and water;
      a housing, wherein an outlet of the inlet pipe is coupled to the housing, wherein a cross-sectional area of the housing is larger than a cross-sectional area of the inlet pipe with respect to the flow of the feed stream, the larger cross-sectional area of the housing configured to slow down the flow of the feed stream, thereby facilitating separation of the oil and the water; and
      a plurality of vanes disposed within the housing, wherein the housing defines a plurality of perforations, and the plurality of vanes are configured to direct flow of the feed stream to exit the housing through the plurality of perforations;
   a module disposed within the vessel downstream of the feed inlet distributor, the module comprising:
      a plurality of coalescer plates, the plurality of coalescer plates configured to facilitate coalescence of the oil;
      a first underflow baffle, the first underflow baffle configured to direct fluid flow under the first underflow baffle;
      a second underflow baffle downstream of the first underflow baffle, the second underflow baffle defining a second plurality of perforations, the second underflow baffle configured to direct fluid flow under the second underflow baffle and through the second plurality of perforations; and
      an overflow baffle disposed between the first and second underflow baffles, the overflow baffle configured to be submerged below a liquid level within the vessel and direct fluid flow over the overflow baffle; and
   an oil skimming trough disposed within the vessel, the oil skimming trough spanning longitudinally across the vessel and downwardly sloped with respect to gravity toward an inner surface of the vessel, the oil skimming trough configured to skim oil from an oil-water interface layer formed within the vessel.

2. The system of claim 1, wherein the module comprises a porous or perforated wall disposed within the vessel between the feed inlet distributor and the plurality of coalescer plates.

3. The system of claim 1, comprising a plurality of modules, each of the modules of the plurality of modules spaced longitudinally apart from one another within the vessel.

4. The system of claim 3, wherein each of the coalescer plates of the plurality of coalescer plates are parallel to one another and upwardly sloped with respect to gravity.

5. The system of claim 1, wherein one or more of the first underflow baffle, the second underflow baffle, or the overflow baffle comprises a rounded tip.

6. The system of claim 1, wherein a spacing between the first underflow baffle and the overflow baffle is substantially the same as a spacing between the overflow baffle and the second underflow baffle.

7. The system of claim 1, comprising a plurality of guide vanes disposed between the first and second underflow baffles and above the overflow baffle with respect to gravity, the plurality of guide vanes configured to be submerged below the liquid level within the vessel.

8. The system of claim 7, wherein the plurality of guide vanes span from the overflow baffle to the second underflow baffle.

9. The system of claim 7, wherein the plurality of guide vanes span from the first underflow baffle to the second underflow baffle.

10. The system of claim 1, wherein the outlet of the inlet pipe is coupled to a lower portion of the housing of the feed inlet distributor, and the plurality of perforations defined by the housing of the feed inlet distributor are on an upper portion of the housing of the feed inlet distributor.

11. The system of claim 1, wherein the oil skimming trough spans longitudinally across the vessel over an area that covers the housing of the feed inlet distributor and the module.

12. The system of claim 1, wherein the module comprises a porous or perforated wall directly upstream of the plurality of coalescer plates, the module is a first module, and the system comprises a second module disposed within the vessel downstream of the first module, the second module substantially the same as the first module, and the oil skimming trough spanning longitudinally across the vessel over an area that covers the housing of the feed inlet distributor, the first module, and the second module.

13. The system of claim 1, wherein the housing of the feed inlet distributor is configured to be submerged below the liquid level within the vessel.

14. The system of claim 1, wherein the plurality of coalescer plates are corrugated, and for each of the coalescer plates of the plurality of coalescer plates, a contact angle between an oil droplet and a surface of the respective coalescer plate is greater than 90 degrees.

15. A method comprising:
   receiving, by an inlet pipe, a feed stream comprising oil and water;
   discharging from an outlet of the inlet pipe the feed stream into a housing having a cross-sectional area larger than a cross-sectional area of the inlet pipe in relation to a direction of fluid flow, the housing disposed within a vessel;

directing, by a plurality of vanes disposed within the housing, the feed stream to exit the housing through a plurality of perforations defined by the housing;

by a module disposed within the vessel downstream of the housing,
- coalescing, by a plurality of coalescer plates of the module, oil droplets of the oil; and
- directing, by the plurality of coalescer plates, the coalesced oil droplets in an upwardly sloped direction that opposes gravity;

directing, by a first underflow baffle of the module, fluid flow under the first underflow baffle;

directing, by an overflow baffle of the module, fluid flow over the overflow baffle, the overflow baffle downstream of the first underflow baffle; and directing, by a second underflow baffle of the module, fluid flow under the second underflow baffle, the second underflow baffle downstream of the overflow baffle;

directing, by an oil skimming trough disposed within the vessel, spanning longitudinally across the vessel, and downwardly sloped with respect to gravity toward an inner surface of the vessel, the coalesced oil droplets toward the inner surface of the vessel; and discharging the water from the vessel.

16. The method of claim 15, wherein the feed stream comprises up to 10 volume % oil.

17. The method of claim 16, wherein the water discharged from the vessel has an oil concentration that is less than 50 parts per million.

18. The method of claim 17, wherein coalescing the droplets of oil comprises receiving the droplets of oil by the plurality of coalescer plates, and the droplets of oil coalesce together while traveling across the plurality of coalescer plates.

\* \* \* \* \*